(12) United States Patent
Zhang et al.

(10) Patent No.: US 12,445,729 B2
(45) Date of Patent: Oct. 14, 2025

(54) IMAGE PROCESSING METHOD AND ELECTRONIC DEVICE

(71) Applicant: Honor Device Co., Ltd., Shenzhen (CN)

(72) Inventors: Wenhong Zhang, Shenzhen (CN); Tao Shao, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/577,602

(22) PCT Filed: Dec. 28, 2022

(86) PCT No.: PCT/CN2022/142766
§ 371 (c)(1),
(2) Date: Jan. 8, 2024

(87) PCT Pub. No.: WO2023/160221
PCT Pub. Date: Aug. 31, 2023

(65) Prior Publication Data
US 2024/0251180 A1    Jul. 25, 2024

(30) Foreign Application Priority Data
Feb. 24, 2022 (CN) .......................... 202210178183.0

(51) Int. Cl.
*H04N 23/69* (2023.01)
*H04N 5/262* (2006.01)
(Continued)

(52) U.S. Cl.
CPC ............ *H04N 23/69* (2023.01); *H04N 5/2628* (2013.01); *H04N 23/632* (2023.01); *H04N 23/71* (2023.01);
(Continued)

(58) Field of Classification Search
CPC .... H04N 23/69; H04N 5/2628; H04N 23/632; H04N 23/71; H04N 23/843; H04N 23/85;
(Continued)

(56) References Cited

U.S. PATENT DOCUMENTS

| | | |
|---|---|---|
| 2010/0309360 A1 | 12/2010 | Kuroiwa |
| 2011/0261217 A1 | 10/2011 | Muukki et al. |
| 2012/0213407 A1 | 8/2012 | Haikin et al. |
| 2013/0258136 A1 | 10/2013 | Lee |

(Continued)

FOREIGN PATENT DOCUMENTS

| | | |
|---|---|---|
| CN | 101557520 A | 10/2009 |
| CN | 103369239 A | 10/2013 |

(Continued)

*Primary Examiner* — Mekonnen D Dagnew
(74) *Attorney, Agent, or Firm* — Slater Matsil, LLP

(57) ABSTRACT

Disclosed are an image processing method and an electronic device, applied to the field of image processing technologies. The method includes: turning on a camera; obtaining a zoom ratio and an environmental illuminance in a current photographing environment; and performing photographing in a first mode when the zoom ratio is greater than or equal to a first ratio and the environmental illuminance is greater than or equal to a first luminance threshold, where in the first mode, the camera is configured to: process an acquired image signal in a non-binning mode and in a cropping manner, to output first image data, where a first image format is used for the first image data.

19 Claims, 13 Drawing Sheets

(51) Int. Cl.
*H04N 23/63* (2023.01)
*H04N 23/71* (2023.01)
*H04N 23/84* (2023.01)
*H04N 23/85* (2023.01)
*H04N 25/42* (2023.01)
*H04N 25/443* (2023.01)
*H04N 25/46* (2023.01)

(52) U.S. Cl.
CPC ........... *H04N 23/843* (2023.01); *H04N 23/85* (2023.01); *H04N 25/42* (2023.01); *H04N 25/443* (2023.01); *H04N 25/46* (2023.01)

(58) Field of Classification Search
CPC ...... H04N 25/42; H04N 25/443; H04N 25/46; H04N 23/631; H04N 23/667; H04N 23/80; H04N 23/95; G06T 5/73; G06T 2207/10016; G06T 2207/10024
See application file for complete search history.

(56) References Cited

U.S. PATENT DOCUMENTS

| | | | | |
|---|---|---|---|---|
| 2018/0152623 | A1* | 5/2018 | Li | H04N 5/2628 |
| 2020/0112692 | A1 | 4/2020 | Ling et al. | |
| 2020/0204746 | A1* | 6/2020 | Kang | H04N 25/134 |
| 2021/0067749 | A1* | 3/2021 | Yadav | H04N 25/135 |
| 2023/0247286 | A1 | 8/2023 | Cui et al. | |

FOREIGN PATENT DOCUMENTS

| | | |
|---|---|---|
| CN | 106791378 A | 5/2017 |
| CN | 107509037 A | 12/2017 |
| CN | 111279680 A | 6/2020 |
| CN | 112367459 A | 2/2021 |
| CN | 112866576 A | 5/2021 |
| CN | 113507549 A | 10/2021 |
| CN | 113727016 A | 11/2021 |
| CN | 113747028 A | 12/2021 |
| CN | 114007011 A | 2/2022 |

* cited by examiner

IMAGE PROCESSING METHOD AND ELECTRONIC DEVICE

CROSS-REFERENCE TO RELATED APPLICATIONS

This application is a national stage of International Application No. PCT/CN2022/142766, filed on Dec. 28, 2022, which claims priority to Chinese Patent Application No. 202210178183.0, filed on Feb. 24, 2022, both of which are incorporated herein by reference in their entireties.

TECHNICAL FIELD

This application relates to the field of image processing technologies, and specifically, to an image processing method and an electronic device.

BACKGROUND

With the increasing development of smart terminals, a shooting function has become an essential function of a smart terminal. The requirements and experience of a user for shooting (photographing and/or video recording) of the smart terminal are also continuously enhanced. The smart terminal may shoot an image in a digital zoom (digital zoom) manner. Digital zoom is cropping and/or zooming an image through a software algorithm.

Currently, in a high-zoom ratio shooting scene, if image output is performed in a binning mode, there is a loss in image definition, resulting in poor image quality and affecting shooting experience of the user.

SUMMARY

In view of this, this application provides an image processing method, an electronic device, a computer-readable storage medium, and a computer program product, which can improve image definition in a high-ratio shooting scene and help to improve shooting experience of a user.

According to a first aspect, an image processing method is provided, including:
turning on a camera;
obtaining a zoom ratio and an environmental illuminance in a current photographing environment; and
performing photographing in a first mode when the zoom ratio is greater than or equal to a first ratio and the environmental illuminance is greater than or equal to a first luminance threshold, where
in the first mode, the camera is configured to: process an acquired image signal in a non-binning mode and in a cropping manner, to output first image data, where a first image format is used for the first image data.

The foregoing first image format is quadra raw data (quadra raw).

The foregoing method may be performed by a terminal device or a chip in a terminal device. Based on the foregoing solution, photographing is performed in the first mode in a high-zoom ratio and high-illuminance scene, image output is performed in the non-binning mode and in the cropping manner, a format of the obtained image data is quadra raw, and quadra raw is used for post-path image processing, which helps to improve image definition.

In embodiments of this application, a post-path processing procedure is designed for the first mode, and specifically relates to a preview stream, a photographing stream, and a thumbnail stream.

In a possible implementation, the first image data is stored in a first buffer; and
the method further includes:
receiving a first operation of a user, where the first operation is used for triggering photographing;
obtaining the first image data from the first buffer in response to the first operation;
performing bayer image reconstruction (Remosaic) on the first image data by using a postprocessing algorithm module or an ISP first module, to obtain second image data, where a second image format is used for the second image data;
demosaicing the second image data by using an ISP second module, to obtain data in an RGB format; and
performing RGB processing or YUV processing on the data in the RGB format by using an ISP third module, to obtain data in a YUV format, and outputting a photographed image.

During processing of a photographing path, compared with sending the first image data into an ISP or a camera for remosaicing, using the postprocessing algorithm module to remosaic the first image data can achieve a better noise reduction effect, and helps to improve definition of the photographed image.

In a possible implementation, the method further includes:
performing bayer image reconstruction on the first image data by using the ISP first module in a thumbnail stream, to obtain data in a bayer format;
demosaicing the data in the bayer format by using the ISP second module, to obtain the data in the RGB format; and
performing RGB processing or YUV processing on the data in the RGB format by using the ISP third module, to obtain the data in the YUV format, and outputting a thumbnail.

Therefore, in the embodiments of this application, a processing manner for the thumbnail stream in the first mode is further provided, which helps to improve image quality of the thumbnail.

In a possible implementation, the method further includes:
remosaicing the first image data by using the ISP first module in a preview path of the first mode, to obtain third image data;
demosaicing the third image data by using the ISP second module, to obtain data in an RGB format; and
performing RGB processing or YUV processing on the data in the RGB format by using the ISP third module, to obtain the data in the YUV format, and outputting a preview image.

Therefore, in the embodiment of this application, a processing manner for a preview stream in the first mode is further provided, which helps to improve image quality of the preview image.

In the embodiments of this application, corresponding photographing procedures are also designed based on different zoom ratios and different environmental illuminances.

In a possible implementation, the method further includes:
performing photographing in a second mode when the zoom ratio is greater than a second ratio and the environmental illuminance is less than the first luminance threshold, where the second ratio is less than the first ratio;

or performing photographing in a second mode when the zoom ratio is greater than a second ratio and less than the first ratio and the environmental illuminance is greater than or equal to the first luminance threshold, where in the second mode, the camera is configured to: perform image output for the acquired image signal in a binning mode, to output fourth image data, where a second image format is used for the fourth image data.

Therefore, photographing is performed in the second mode when the zoom ratio is greater than the second ratio and the scene is a low-illuminance scene; and photographing is also performed in the second mode, that is, the camera performs image output in the binning mode, when the zoom ratio is greater than the second ratio and less than the first ratio and the scene is a high-illuminance scene, which can ensure sensitivity and help to improve a signal-to-noise ratio of an image.

In a possible implementation, the method further includes:

demosaicing the fourth image data by using an ISP second module in a preview path of the second mode, to obtain data in an RGB format; and performing RGB processing or YUV processing on the fourth image data and the data in the RGB format by using an ISP third module, to obtain data in a YUV format, cropping and upsampling the data in the YUV format, and outputting a preview image.

In the foregoing second mode, quality of the preview image can be improved through the foregoing processing procedure.

In a possible implementation, the fourth image data is stored in a first buffer; and the method further includes:

receiving a second operation of a user, where the second operation is used for triggering photographing;

obtaining the fourth image data from the first buffer in response to the second operation;

performing image processing on the fourth image data by using a postprocessing algorithm module or an ISP second module, to obtain fifth image data; and cropping and upsampling the fifth image data by using the postprocessing algorithm module or an ISP third module, and outputting a photographed image.

In the foregoing second mode, quality of the photographed image can be improved through the foregoing processing procedure.

In a possible implementation, the method further includes:

demosaicing the fourth image data by using the ISP second module in a thumbnail stream, to obtain data in an RGB format; and performing RGB processing or YUV processing on the data in the RGB format by using the ISP third module, to obtain data in a YUV format, cropping and upsampling the data in the YUV format, and outputting a thumbnail.

In the foregoing second mode, image quality of the thumbnail can be improved through the foregoing processing procedure.

In a possible implementation, the method further includes:

performing photographing in a third mode when the zoom ratio is equal to a second ratio and the environmental illuminance is greater than or equal to the first luminance threshold, where the second ratio is less than the first ratio;

or performing photographing in a third mode when the zoom ratio is equal to a second ratio and the environmental illuminance is less than the first luminance threshold, where in the third mode, the camera is configured to: perform image output for the acquired image signal in a binning mode, to output sixth image data, where a second image format is used for the sixth image data.

Therefore, when the zoom ratio is equal to the second ratio, image definition can satisfy a requirement. Therefore, a signal-to-noise ratio factor is prioritized, and photographing is performed in the third mode in a full scene (a high-illuminance scene and a low-illuminance scene) in which the zoom ratio is equal to the second ratio, which can improve a signal-to-noise ratio.

In a possible implementation, the sixth image data is stored in a first buffer; and the method further includes:

receiving a third operation of a user, where the third operation is used for triggering photographing;

obtaining the sixth image data from the first buffer in response to the third operation;

performing image processing on the sixth image data by using a postprocessing algorithm module or an ISP second module, to obtain seventh image data; and performing RGB processing or YUV processing on the seventh image data by using an ISP third module, to obtain data in a YUV format, and outputting a photographed image.

In the foregoing third mode, quality of the photographed image can be improved through the foregoing processing procedure.

In a possible implementation, the method further includes:

demosaicing the sixth image data by using the ISP second module in a thumbnail stream, to obtain data in an RGB format; and performing RGB processing or YUV processing on the data in the RGB format by using the ISP third module, to obtain data in a YUV format, and outputting a thumbnail.

In the foregoing third mode, image quality of the thumbnail can be improved through the foregoing processing procedure.

In a possible implementation, the method further includes:

demosaicing the sixth image data by using the ISP second module in a preview path of the third mode, to obtain data in an RGB format; and performing RGB processing or YUV processing on the data in the RGB format by using the ISP third module, to obtain data in a YUV format, and outputting a preview image.

In the foregoing third mode, quality of the preview image can be improved through the foregoing processing procedure.

According to a second aspect, an electronic device is provided, and includes units configured to perform any method in the first aspect. The electronic device may be a terminal or may be a chip in a terminal. The electronic device includes an input unit, a display unit, and a processing unit.

When the electronic device is a terminal, the processing unit may be a processor, the input unit may be a communication interface, and the display unit may be a graphics processing module and a screen; and the terminal may further include a memory, the memory is configured to store computer program code, and when the processor executes the computer program code stored in the memory, the terminal is caused to perform any method in the first aspect.

When the electronic device is a chip in a terminal, the processing unit may be a logic processing unit in the chip, the input unit may be an output interface, a pin, a circuit, or the like, and the display unit may be a graphics processing unit inside the chip; the chip may further include a memory, and the memory may be a memory (for example, a register or a buffer) in the chip, or may be a memory (for example, a read-only memory or a random access memory) outside the chip; and the memory is configured to store computer program code, and when a processor executes the computer program code stored in the memory, the chip is caused to perform any method in the first aspect.

In an implementation, the processing unit is configured to: turn on a camera; obtain a zoom ratio and an environmental illuminance in a current photographing environment; and perform photographing in a first mode when the zoom ratio is greater than or equal to a first ratio and the environmental illuminance is greater than or equal to a first luminance threshold, where in the first mode, the camera is configured to: process an acquired image signal in a non-binning mode and in a cropping manner, to output first image data, where a first image format is used for the first image data.

The foregoing first image format is quadra raw data (quadra raw).

In a possible implementation, the first image data is stored in a first buffer; and
   the input unit is configured to receive a first operation of a user, where the first operation is used for triggering photographing;
   the processing unit is configured to obtain the first image data from the first buffer;
   further configured to invoke a postprocessing algorithm module or an ISP first module to perform bayer image reconstruction (Remosaic) on the first image data, to obtain second image data, where a second image format is used for the second image data;
   further configured to invoke an ISP second module to demosaic the second image data, to obtain data in an RGB format; and
   further configured to invoke an ISP third module to perform RGB processing or YUV processing on the data in the RGB format, to obtain data in a YUV format, and output a photographed image.

In a possible implementation, the processing unit is further configured to:
   invoke the ISP first module to perform bayer image reconstruction on the first image data in a thumbnail stream, to obtain data in a bayer format;
   invoke the ISP second module to demosaic the data in the bayer format, to obtain the data in the RGB format; and
   invoke the ISP third module to perform RGB processing or YUV processing on the data in the RGB format, to obtain data in a YUV format, and output a thumbnail.

In a possible implementation, the processing unit is further configured to:
   invoke the ISP first module to remosaic the first image data in a preview path of the first mode, to obtain third image data;
   invoke the ISP second module to demosaic the third image data, to obtain data in an RGB format; and
   invoke the ISP third module to perform RGB processing or YUV processing on the data in the RGB format, to obtain data in a YUV format, and output a preview image.

In a possible implementation, the processing unit is further configured to:
   perform photographing in a second mode when the zoom ratio is greater than a second ratio and the environmental illuminance is less than the first luminance threshold, where the second ratio is less than the first ratio; or
   perform photographing in a second mode when the zoom ratio is greater than a second ratio and less than the first ratio and the environmental illuminance is greater than or equal to the first luminance threshold, where
   in the second mode, the camera is configured to: perform image output for the acquired image signal in a binning mode, and output fourth image data, where a second image format is used for the fourth image data.

In a possible implementation, the processing unit is further configured to:
   invoke an ISP second module to demosaic the fourth image data in a preview path of the second mode, to obtain data in an RGB format; and
   invoke an ISP third module to perform RGB processing or YUV processing on the fourth image data and the data in the RGB format, to obtain data in a YUV format, crop and upsample the data in the YUV format, and output a preview image.

In a possible implementation, the fourth image data is stored in a first buffer; and
   the input unit is configured to receive a second operation of a user, where the second operation is used for triggering photographing.

The processing unit is further configured to: obtain the fourth image data from the first buffer in response to the second operation;
   invoke a postprocessing algorithm module or an ISP second module to perform image processing on the fourth image data, to obtain fifth image data; and
   invoke the postprocessing algorithm module or an ISP third module to crop and upsample the fifth image data, and output a photographed image.

In a possible implementation, the processing unit is further configured to:
   invoke the ISP second module to demosaic the fourth image data in a thumbnail stream, to obtain data in an RGB format; and
   invoke the ISP third module to perform RGB processing or YUV processing on the data in the RGB format, to obtain data in a YUV format, crop and upsample the data in the YUV format, and output a thumbnail.

In a possible implementation, the processing unit is further configured to:
   perform photographing in a third mode when the zoom ratio is equal to a second ratio and the environmental illuminance is greater than or equal to the first luminance threshold, where the second ratio is less than the first ratio;
   or perform photographing in a third mode when the zoom ratio is equal to a second ratio and the environmental illuminance is less than the first luminance threshold, where
   in the third mode, the camera is configured to: perform image output for the acquired image signal in a binning mode, to output sixth image data, where a second image format is used for the sixth image data.

In a possible implementation, the sixth image data is stored in a first buffer, and the input unit is configured to: receive a third operation of a user, where the third operation is used for triggering photographing.

The processing unit is further configured to: obtain the sixth image data from the first buffer in response to the third operation;

invoke a postprocessing algorithm module or an ISP second module to perform image processing on the sixth image data, to obtain seventh image data; and invoke an ISP third module to perform RGB processing or YUV processing on the seventh image data, to obtain data in a YUV format, and output a photographed image.

In the foregoing third mode, quality of the photographed image can be improved through the foregoing processing procedure.

In a possible implementation, the processing unit is further configured to:

invoke the ISP second module to demosaic the sixth image data in a thumbnail stream, to obtain data in an RGB format; and invoke the ISP third module to perform RGB processing or YUV processing on the data in the RGB format, to obtain data in a YUV format, and output a thumbnail.

In a possible implementation, the processing unit is further configured to:

invoke the ISP second module to demosaic the sixth image data in a preview path of the third mode, to obtain data in an RGB format; and invoke the ISP third module to perform RGB processing or YUV processing on the data in the RGB format, to obtain data in a YUV format, and output a preview image.

According to a third aspect, a computer-readable storage medium is provided, storing computer program code, the computer program code, when run by an electronic device, causing the electronic device to perform any method in the first aspect.

According to a fourth aspect, a computer program product is provided, including computer program code, the computer program code, when run by an electronic device, causing the electronic device to perform any method in the first aspect.

DETAILED DESCRIPTION OF THE EMBODIMENTS

The following describes technical solutions in embodiments of this application with reference to the accompanying drawings.

In the embodiments of this application, "plurality" may mean two or more unless otherwise described.

The embodiments of this application are applicable to an electronic device. The electronic device may be a mobile phone, a smart screen, a tablet computer, a wearable electronic device, an in-vehicle electronic device, an augmented reality (augmented reality, AR) device, a virtual reality (virtual reality, VR) device, a notebook computer, an ultra-mobile personal computer (ultra-mobile personal computer, UMPC), a netbook, a personal digital assistant (personal digital assistant, PDA), a projector, or the like.

The electronic device in the embodiments of this application is equipped with an image acquisition device (for example, a camera).

A specific type of the electronic device is not limited in the embodiments of this application. An example in which the electronic device is a mobile phone is used below to describe an image processing method according to an embodiment of this application.

Description is provided in the following with reference to a scene in FIG. 1A, FIG. 1B, FIG. 1C, and FIG. 1D. FIG. 1A, FIG. 1B, FIG. 1C, and FIG. 1D are an example diagram of an application scenario according to an embodiment of this application.

Figure 1A:
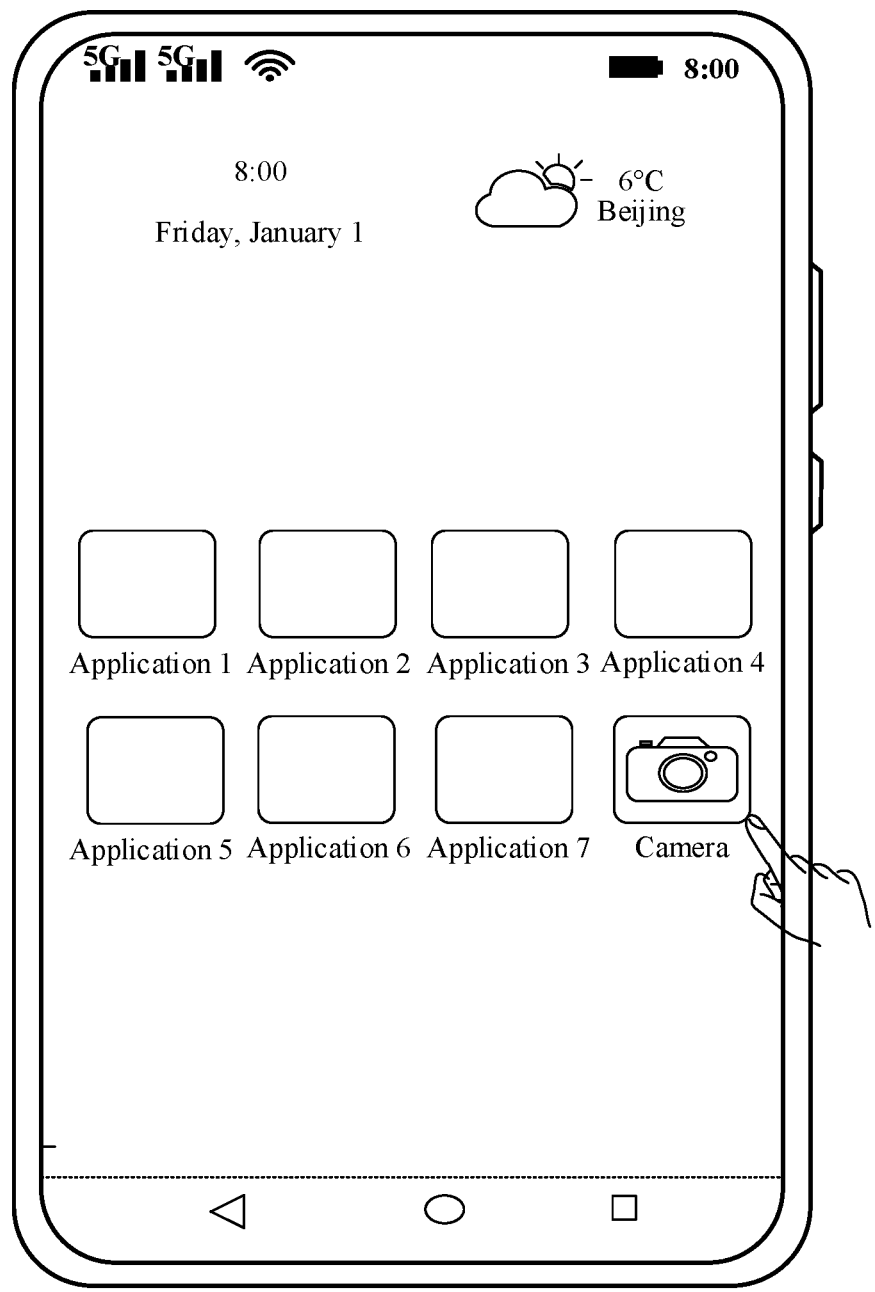
FIG. 1A, FIG. 1B, FIG. 1C, and FIG. 1D are an example diagram of an application scenario according to an embodiment of this application.
Figure 1B:
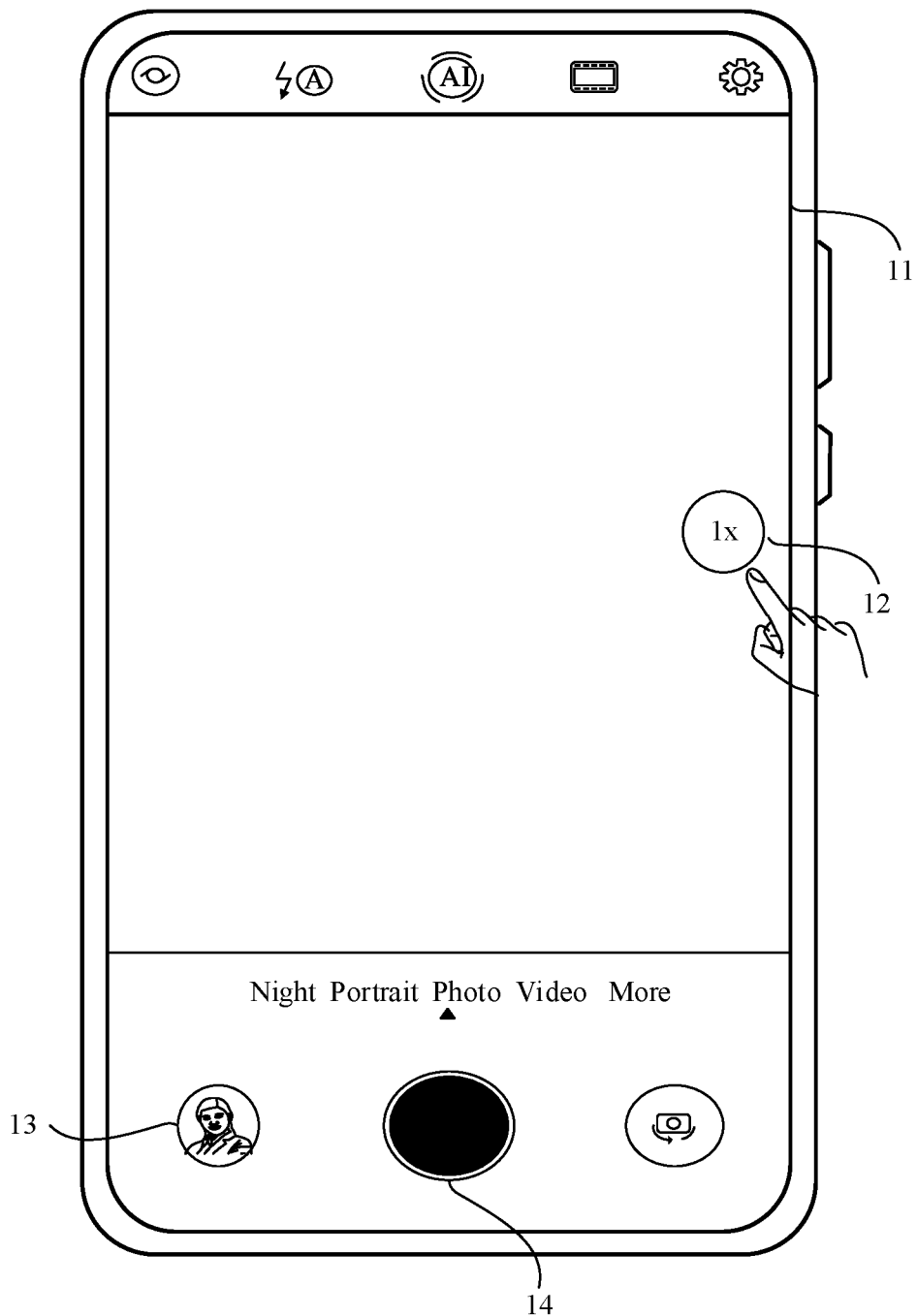

As shown in a mobile phone interface in FIG. 1A, a plurality of application programs: an application 1, an application 2, . . . , an application 7, and a camera application program, can be displayed in the interface. A user taps the camera application program, and a mobile phone turns on a camera. After the camera is run, an interface shown in FIG. 1B is displayed in the mobile phone interface. The interface may be referred to as a shooting interface of the camera. The shooting interface may include a viewfinder frame 11, a zoom ratio 12 (defaulted as 1×), an album icon 13, a shooting control 14, a camera rotation control, and the like. The user taps the shooting control 14 and can photograph. In the interface, the album icon 13 displays a thumbnail. The camera rotation control may be configured to switch the camera.

The viewfinder frame 11 is configured to obtain a preview image while shooting and may display the preview image in real time.

The mobile phone supports digital zoom. When using a shooting function, the user may select different zoom ratios through operating on a touchscreen.

Figure 1C:
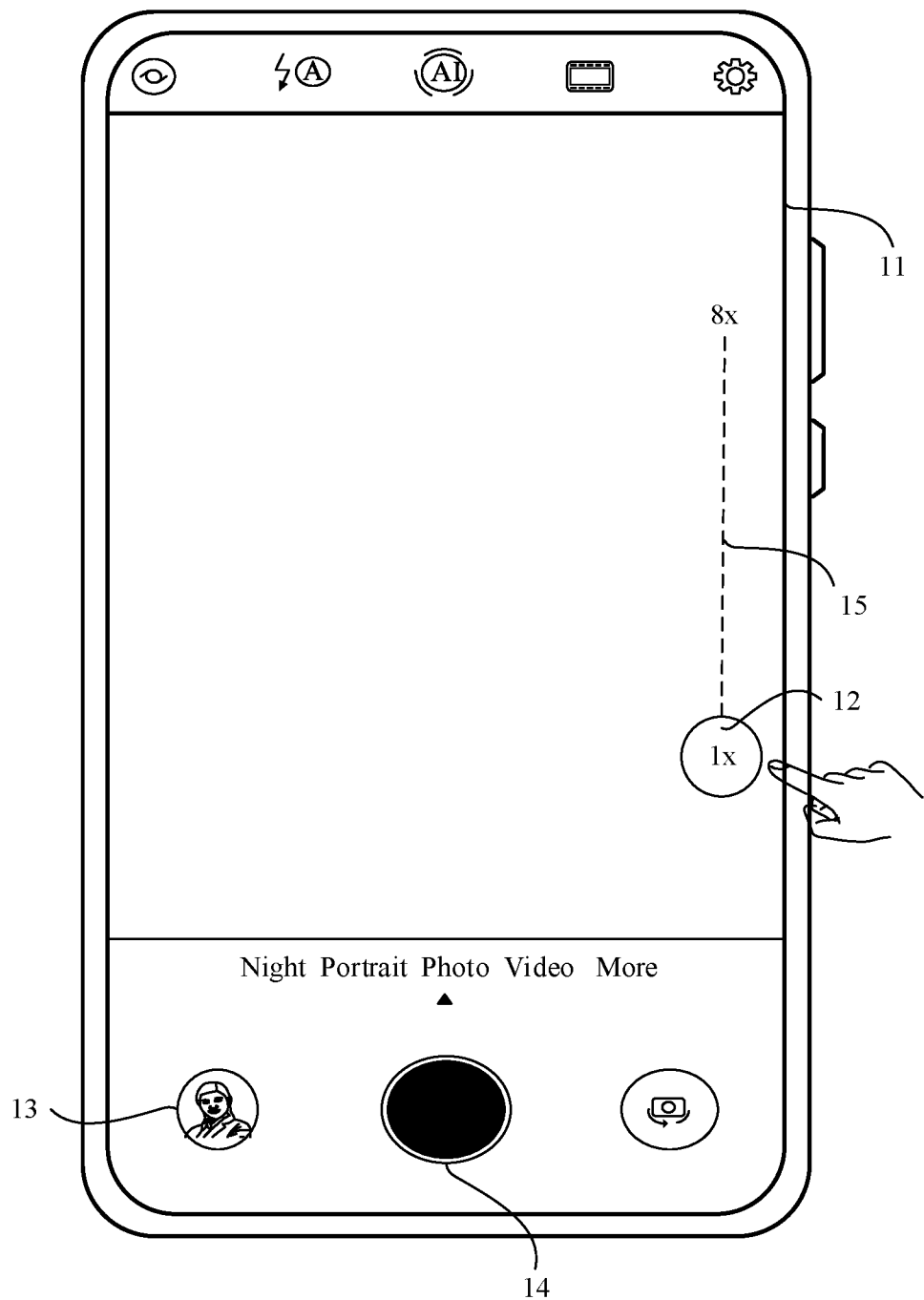
Figure 1D:
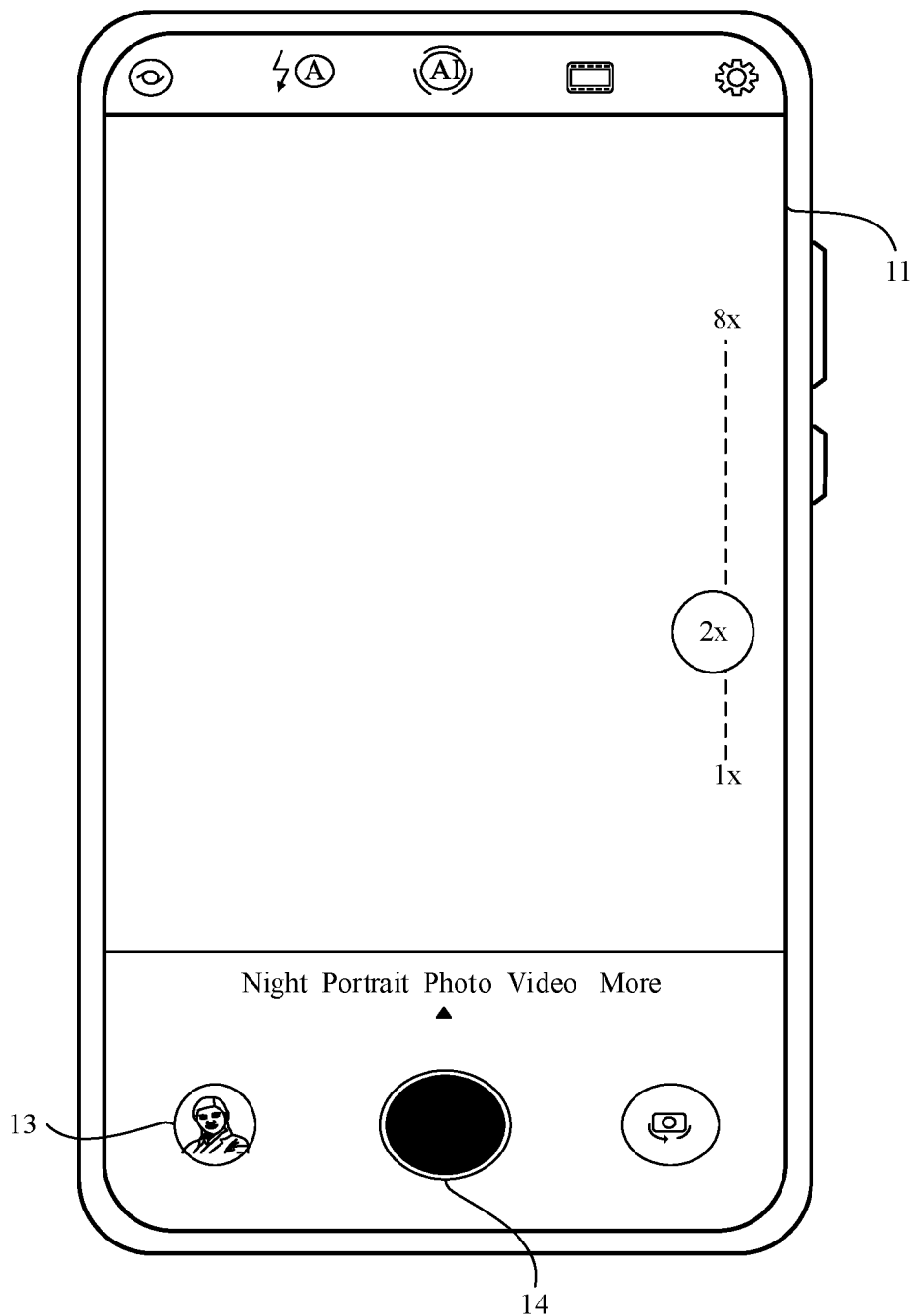

As an example, as shown in FIG. 1B, the user taps the zoom ratio 12 in FIG. 1B, the interface is displayed as shown in FIG. 1C, and a selection item 15 (for example, a highest zoom ratio is 8×, and a lowest zoom ratio is 1×) for the zoom ratio appears. The user drags the zoom ratio 12 upward in the selection item 15, and let go when the zoom ratio is 2×. What shown in FIG. 1D is displayed in the interface, that is, the zoom ratio is selected to be 2×. Certainly, after the zoom ratio is selected, the selection item 15 for the zoom ratio may be hidden, that is, that the selected zoom ratio is 2× is displayed on the interface.

It should be understood that, the photographing scene in FIG. 1A, FIG. 1B, FIG. 1C, and FIG. 1D is only a schematic illustration of an application scenario of this application, which does not limit the embodiments of this application. In fact, the embodiments of this application may also be applied to another scene, such as a video recording scene, a video call scene, or a video streaming scene, in which a camera is used.

It should be further understood that, FIG. 1B shows a schematic diagram of an interface in which the user performs photographing in a portrait mode of the mobile phone, but this application is not limited to this. For example, the user may shoot in a landscape mode of the mobile phone.

It should be further understood that, an upper limit and a lower limit (namely, the largest zoom ratio and the smallest zoom ratio) of the selection item 15 for the zoom ratio shown in FIG. 1C may depend on implementation of the mobile phone. Values of the upper limit and the lower limit shown in FIG. 1C are only examples, and the embodiments of this application are not limited to thereto.

It should be further understood that, a location of the selection item 15 for the zoom ratio in the interface shown in FIG. 1C is only an example, and the embodiments of this application are not limited thereto.

In some embodiments, the mobile phone may use a camera (camera) with quadra color filter array (Quadra Color Filter Array, Quadra CFA) sensor (sensor). Key devices of the camera include an optical lens (lens) and an image sensor (sensor). After the camera is turned on, the sensor may perform image output based on an acquired image signal. In this embodiment of this application, a manner in which the sensor performs image output depends on a zoom ratio and an environmental illuminance of a shooting scene.

It may be understood that, how to turn on the camera is not specifically limited in this embodiment of this application. For example, as shown in FIG. 1A, the user may turn on the camera by tapping the camera application program.

Currently, in a high-zoom ratio scene, the sensor generally performs image output in a binning mode (binning mode). The high zoom ratio is a zoom ratio that satisfies a preset condition.

A definition of the high zoom ratio is not specifically limited in this embodiment of this application. In an implementation, a zoom ratio higher than or equal to a zoom ratio threshold may be defined as the high zoom ratio. For example, a zoom ratio higher than or equal to 2× is defined as the high zoom ratio. In another implementation, a zoom ratio falling within a specified zoom ratio range is defined as the high zoom ratio, or the like. For example, a zoom ratio falling within a range from 2× to 8× is defined as the high zoom ratio.

The binning mode is a process in which charges induced by adjacent pixels are added together and are read out in a one-pixel mode. Image data outputted in the binning mode is in a bayer format (bayer raw). For example, in the binning mode, the sensor may sum and average 4 pixel values to obtain a value of one pixel, which is outputted as a processed pixel value.

An advantage of the binning mode is that a signal-to-noise ratio in a dark light environment can be improved and there is better sensitivity. However, the binning mode is not applicable to the high-zoom ratio scene. If image output is performed in the binning mode in a high zoom ratio, there is a loss in image definition, which affects user experience.

A reason for the loss in definition is that: in a case of digital zoom, a manner of cropping based on an original image (the original image herein is an original image obtained by the sensor based on the binning mode) is generally used, to implement a change of a digital zoom field of view (FOV) and use an upsampling algorithm to restore resolution of the image. However, for a high-zoom ratio situation, as the zoom ratio increases, an area cropped from the original image is larger, and then there is a severer loss in resolution or definition of the image in an original size obtained through the upsampling algorithm.

In view of this, the embodiments of this application provide an image processing method and an electronic device. According to the image processing method in the embodiments of this application, in a high-zoom ratio and high-illuminance scene, a sensor performs image output in a non-binning mode and in a cropping manner, a format of obtained image data is quadra original data (quadra raw), and quadra raw is used for post-path image processing, which helps to improve image definition.

In addition, for photographing scenes with different zoom ratios and different environmental illuminances, corresponding modes or photographing procedures are designed and each component is utilized to an advantage thereof in the embodiments of this application, thereby achieving an objective of improving image quality and improving user experience in various scenes.

For ease of understanding, before a photographing method of the embodiments of this application is introduced, some terms involved in the embodiments of this application are first explained.

Non-binning mode (non-binning mode): In a non-binning mode, an image with same resolution as a sensor is provided. The sensor performs image output in the non-binning mode, and an image format is a quadra raw (quadra raw) format, instead of bayer raw.

Image signal processor (image signal processor, ISP): An ISP is configured to process a digital image signal acquired by a camera and obtain an image that matches human eyes. The ISP may include a plurality of submodules, for example, an ISP first module, an ISP second module, and an ISP third module.

For ease of ISP processing, quadra raw obtained in a non-binning mode needs to be converted into bayer raw.

Bayer image reconstruction (Remosaic): By rearranging pixels or pixel swapping, data in a non-binning mode is converted into standard bayer raw. In the embodiments of this application, remosaicing may be implemented by using a postprocessing algorithm module or an ISP first module.

Demosaic (Demosaic): Demosaicing is used for converting data in a bayer format into data in an RGB format. Demosaicing may be understood as color interpolation processing, which is to restore real-world colors that conform to a color display device from bayer data obtained from a sensor.

Cropping: Through cropping an acquired image, an image of a field of view corresponding to a zoom ratio is obtained. Cropping may be implemented through a crop function. For example, an image of a field of view corresponding to 2× is obtained by using the crop function.

Upsampling: Restoring resolution of a feature image to resolution of an original image. Upsampling may enlarge an image through a scale (scale) function. For example, after an image at 2× is obtained, the image at 2× is enlarged by using the scale function, so that a size of the image is the same as a size of an image at 1×.

Environmental illuminance: Light intensity of a shooting environment when a user performs shooting. A value of the environmental illuminance may be represented by using the following indicators: lighting value (lighting value, LV), illuminance (lux) or illuminance index value (luxindex), or the like.

LV is used for estimating environmental luminance, and a specific calculation formula thereof is as below:

$$LV = 10 * \log_2\left(\frac{\text{Aperture}^2}{\text{Exposure}} * \frac{100}{Iso} * \frac{\text{Luma}}{46}\right)$$

where Exposure is exposure time, Aperture is an aperture size, Iso is sensitivity, and Luma is an average value of Y of an image in an XYZ color space.

In the embodiments of this application, a format of image data outputted in the non-binning mode is named as a first image format. For example, the first image format is quadra raw.

In the embodiments of this application, a format of image data outputted in the binning mode is named as a second image format. For example, the second image format is bayer raw.

When the camera is turned on, the electronic device may obtain a zoom ratio (for example, the user may select a zoom ratio through the zoom ratio 12 in FIG. 1B) and an environmental illuminance that are in a current photographing environment. For different zoom ratios and different environmental illuminances, corresponding processing solutions (for example, a first mode, a second mode, and a third mode) are provided in the embodiments of this application. Description is provided below with reference to FIG. 2.

Figure 2:
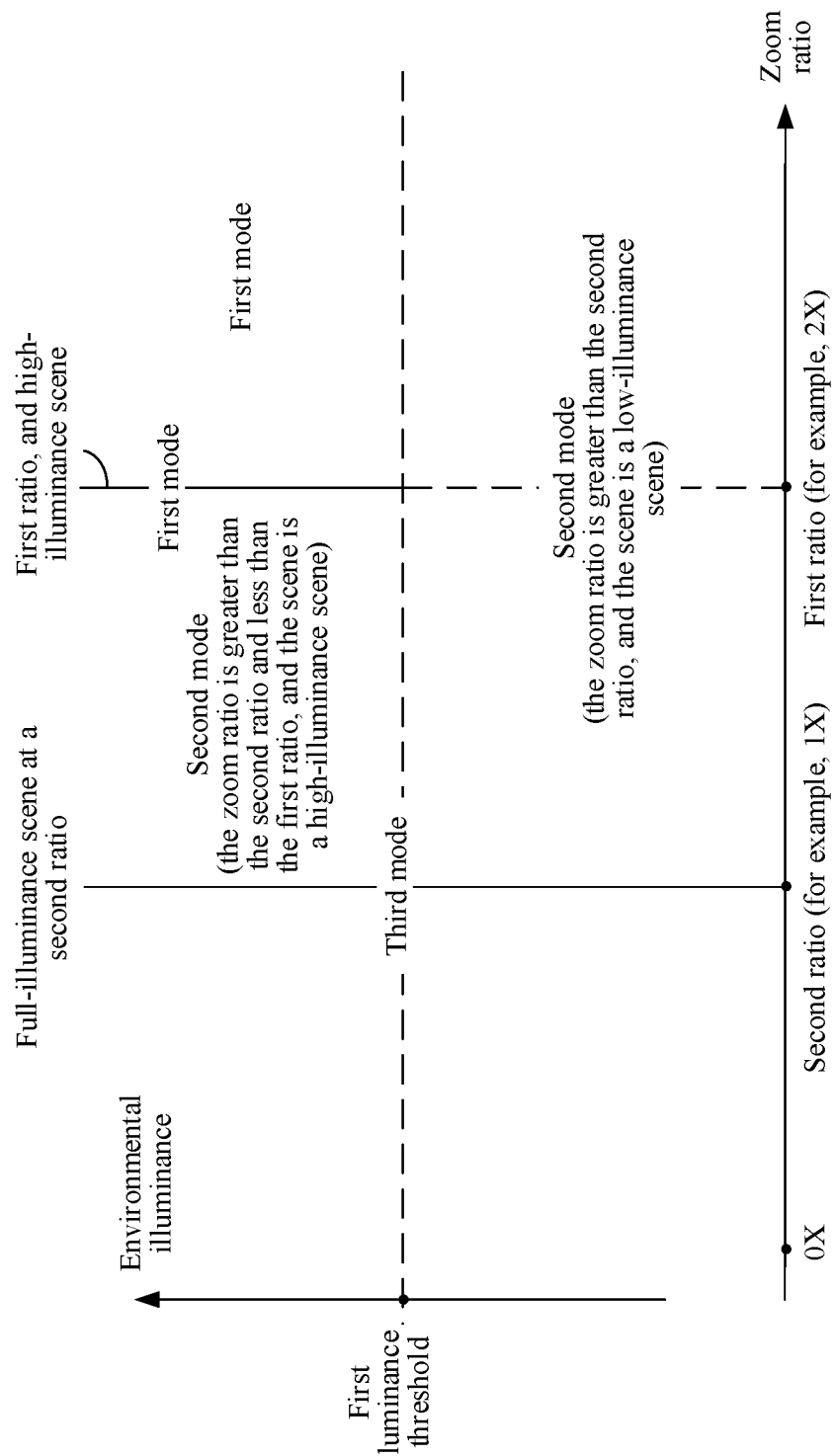
FIG. 2 is a schematic diagram of processing modes in different zoom ratios and in different environmental illuminances according to an embodiment of this application.

FIG. 2 is a schematic diagram of corresponding processing modes in different zoom ratios and in different environmental illuminances according to an embodiment of this application.

As shown in FIG. 2, the zoom ratio gradually increases from left to right. In FIG. 2, a zoom ratio range is divided based on a first ratio and a second ratio. The first ratio is greater than the second ratio. The first ratio may be a zoom ratio greater than or equal to 2. For example, the first ratio is 2×, and the second ratio is 1×. For another example, the first ratio is 4×, and the second ratio is 1×.

As shown in FIG. 2, the environmental illuminance gradually increases from bottom to top. In FIG. 2, the environmental illuminance is divided into a low illuminance (or referred to as a dark light environment) and a high illuminance (or referred to as a bright light environment) based on a first luminance threshold.

For example, if the environmental illuminance is greater than or equal to the first luminance threshold, it is a high-illuminance scene; and if the environmental illuminance is less than the first luminance threshold, it is a low-illuminance scene.

It should be understood that, here a situation in which the environmental illuminance is equal to the first luminance threshold is classified as the high-illuminance scene, but this embodiment of this application is not limited thereto. For example, the situation in which the environmental illuminance is equal to the first luminance threshold may alternatively be classified as the low-illuminance scene. The high-illuminance scene and the low-illuminance scene are described below.

As a possible implementation, the environmental illuminance may be represented by using LV. Correspondingly, the first luminance threshold is a first LV value.

As a possible implementation, the environmental illuminance may be represented by using luxindex. Correspond-ingly, the first luminance threshold is a luxindex value. The greater the luxindex value, the lower the environmental illuminance; and the less the luxindex value, the higher the environmental illuminance.

As shown in FIG. 2, when the zoom ratio is greater than or equal to the first ratio and the environmental illuminance is the high illuminance, a sensor processes an image signal based on a first mode. In the first mode, the sensor performs image output in a non-binning+cropping mode, in other words, the sensor processes a digital image signal in a non-binning mode and performs corresponding cropping processing based on the zoom ratio.

As shown in FIG. 2, when the zoom ratio is greater than the second ratio and less than the first ratio and the environmental illuminance is the high-illuminance scene, the image signal is processed based on a second mode. In the second mode, the sensor performs image output in a binning mode.

As shown in FIG. 2, when the zoom ratio is greater than the second ratio and the environmental illuminance is the low-illuminance scene, the image signal is processed based on the second mode.

As shown in FIG. 2, in a full-illuminance scene, that is, regardless of being the high-illuminance scene or the low-illuminance scene, in which the zoom ratio is equal to the second ratio, the image signal is processed based on a third mode. In the third mode, the sensor performs image output in the binning mode.

It should be noted that, the sensor in the second mode and the sensor in the third mode perform image output in the same manner, which is the binning mode. A difference lies in post-path processing, which is described in detail below when a relevant processing procedure is introduced.

It may be understood that, when the zoom ratio is less than the second ratio, whether to use a processing manner for a case in which the zoom ratio is equal to the second ratio shown in FIG. 2 may depend on specific implementation of a product, which is not specifically limited in this embodiment of this application. For example, when the zoom ratio selected by a user is greater than ox and less than 1×, if the electronic device has an ultra-wide-angle camera, the camera may be switched to the ultra-wide-angle camera for processing. For another example, when the zoom ratio selected by the user is greater than ox and less than 1×, the camera may not be switched, and the processing manner for the case in which the zoom ratio is equal to the second ratio shown in FIG. 2 is used.

Technical effects of selecting corresponding modes shown in FIG. 2 in different zoom ratios and different environmental illuminances are described below.

When the zoom ratio is greater than or equal to the first ratio, modes used in different environmental illuminances are different, which specifically includes: (1) in the high-illuminance scene, image definition is a priority, and the first mode (the sensor performs image output in the non-binning mode and in the cropping manner) is used, which helps to improve the image definition; and (2) in the low-illuminance scene, a signal-to-noise ratio is a priority, and the second mode (the sensor performs image output in the binning mode) is used, which helps to improve the signal-to-noise ratio in the dark light environment.

When the zoom ratio is greater than the second ratio and less than the first ratio, the second mode (the sensor performs image output in the binning mode) is used in each environmental illuminance, which helps to improve the signal-to-noise ratio.

When the zoom ratio is equal to the second ratio, the third mode (the sensor performs image output in the binning mode) is used in each environmental illuminance. This is because a resolution requirement for an image can be satisfied when the zoom ratio is the second ratio, a factor of the signal-to-noise ratio needs to be a priority, and the sensor performs image output in the binning mode, which helps to improve the signal-to-noise ratio.

When the environmental illuminance is the high-illuminance scene: (1) when the zoom ratio is greater than or less than the first ratio, the image definition is a priority, and the first mode is used, which helps to improve the image definition; (2) when the zoom ratio is greater than the second ratio and less than the first ratio, the second mode (the sensor performs image output in the binning mode) is used, which can improve the signal-to-noise ratio; and (3) when the zoom ratio is equal to the second ratio, there is no loss in definition, so that just the third mode (the sensor performs image output in the binning mode) is used, which helps to reduce power consumption.

When the environmental illuminance is the low-illuminance scene, no matter how the zoom ratio changes, the sensor performs image output in the binning mode, which ensures sensitivity in the dark light environment and helps to improve the signal-to-noise ratio.

In conclusion, in different digital zoom ratios and different environmental illuminance scenes, appropriate image production modes or photographing procedures are designed in this embodiment of this application to achieve an objective of improving image quality.

In each of the three modes mentioned in the foregoing FIG. 2, processing procedures of a preview stream, a photographing stream, and a thumbnail stream are supported. A specific processing procedure for an image signal in each mode is described in detail below with reference to FIG. 3 to FIG. 8.

Figure 3:
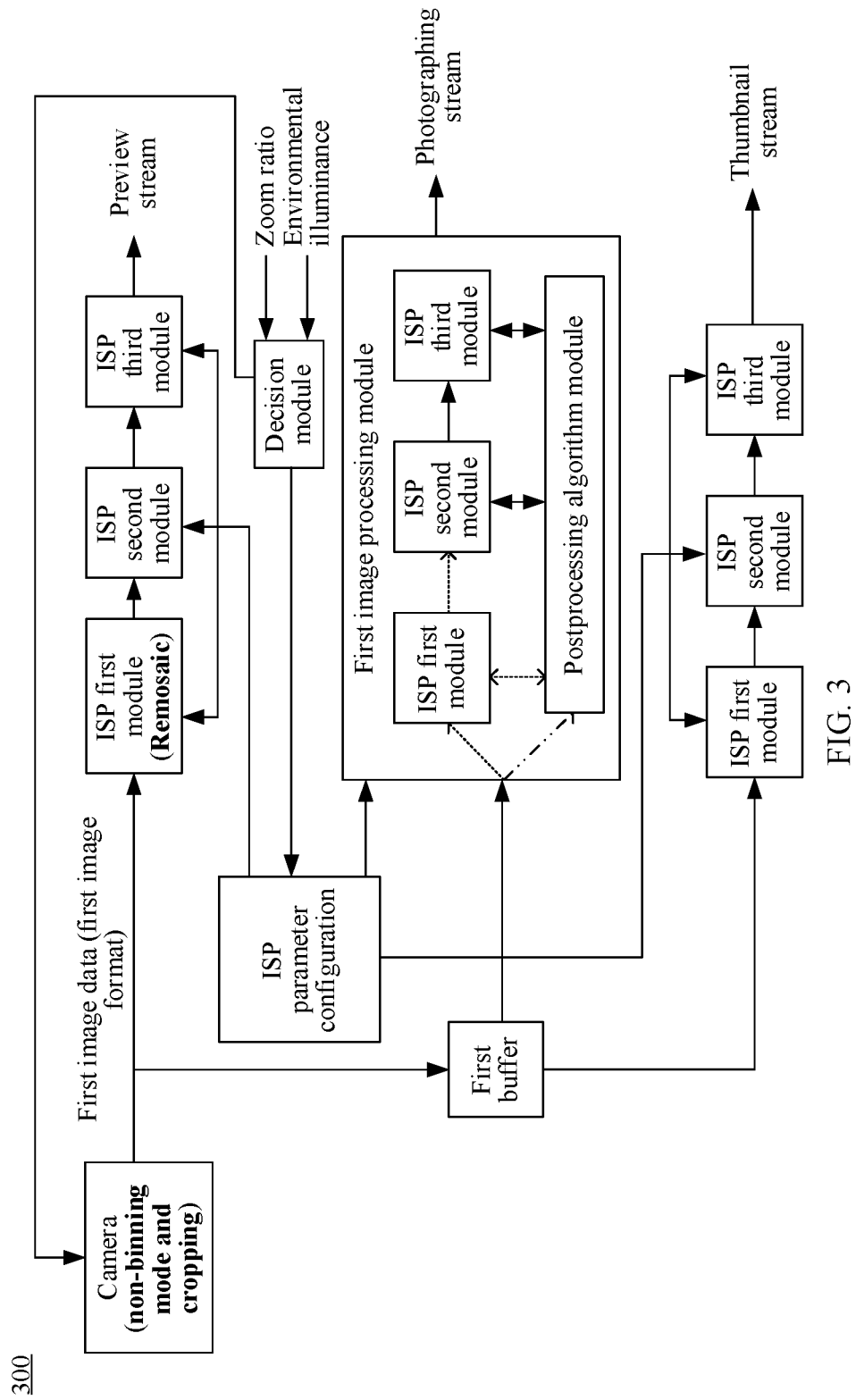
FIG. 3 is a schematic block diagram of a photographing system according to an embodiment of this application.

A relevant design of the first mode is described below with reference to FIG. 3. FIG. 3 is a schematic block diagram of a photographing system 300 according to an embodiment of this application. As shown in FIG. 3, the photographing system 300 includes a decision module, an ISP parameter configuration module, a camera, a first buffer, a first image processing module, an ISP first module, an ISP second module, and an ISP third module. The camera includes an optical lens and an image sensor (sensor).

It should be understood that, an ISP first module, an ISP second module, and an ISP third module that are involved in a preview stream, an ISP first module, an ISP second module, and an ISP third module that are involved in a photographing stream, and an ISP first module, an ISP second module, and an ISP third module that are involved in a thumbnail stream may be partially or completely multiplexed, or may be independent of each other, which is not limited in this embodiment of this application.

For example, the preview stream corresponds to a set of an ISP first module, an ISP second module, and an ISP third module; the photographing stream corresponds to a set of an ISP first module, an ISP second module, and an ISP third module; and the thumbnail stream corresponds to a set of an ISP first module, an ISP second module, and an ISP third module. For another example, the preview stream, the photographing stream, and the thumbnail stream share a same set of an ISP first module, an ISP second module, and an ISP third module. For another example, the preview stream and the photographing stream multiplex an ISP first module, the preview stream corresponds to a set of an ISP second module and an ISP third module, the photographing stream corresponds to a set of an ISP second module and an ISP third module, the thumbnail stream corresponds to a set of an ISP second module and an ISP third module, and the like.

It may be understood that, the foregoing description about the ISP first module, the ISP second module, and the ISP third module is only example description, and this embodiment of this application is not limited thereto.

It may be understood that, the foregoing description about the ISP first module, the ISP second module, and the ISP third module is also applicable to the following FIG. 5 and FIG. 7, and details are not described below again.

The decision module is configured to determine a parameter configuration of each module (including the camera, the ISP first module, the ISP second module, the ISP third module, or a postprocessing algorithm module) according to factors such as a zoom ratio and an environmental illuminance. A relevant parameter configuration of each module may be delivered to each module by using an ISP parameter configuration module. In other words, the decision module controls or allocates a function or an action of each module by using the ISP parameter configuration module, for example, enables or disables which ISP modules, in which manner the ISP module processes image data, and the like.

As a possible implementation, when the zoom ratio is greater than or equal to the first ratio and the environmental illuminance is a high-illuminance environment, the decision module determines at least the following parameter configurations: a manner in which the camera (or sensor) performs image output is a non-binning+cropping mode (or may also be expressed as non-binning mode+cropping shown in FIG. 3), image processing of the ISP first module in the preview stream includes remosaicing, the postprocessing algorithm module or the ISP first module in the photographing stream includes remosaicing, and image processing of the ISP first module in the thumbnail stream includes remosaicing.

Optionally, the decision module may further configure another parameter such as a color, a luminance effect, or a zoom ratio of each ISP module, and control ISP parameter configurations of the ISP modules to be consistent.

In the first mode, the camera is configured to: acquire an image signal, and process the acquired image signal in a non-binning mode and in a cropping manner, to output first image data. A first image format is used for the first image data. The first image format is quadra raw (quadra raw). To put it another way, the sensor performs image output in a non-binning+cropping manner.

It is to be noted that, because herein a manner in which the sensor performs image output is the non-binning mode, compared to the binning mode, there is no loss in image resolution (or definition) in the non-binning mode, and because ensuring the image definition needs to be prioritized in the high zoom ratio (for example, the zoom ratio is greater than or equal to the first ratio), performing image output in the non-binning mode in the high zoom ratio is more appropriate. In addition, after image output is performed in the non-binning mode, an image of a field of view corresponding to the high zoom ratio may be obtained by just cropping, and there is no need to upsample the image again.

For example, assuming that resolution of the sensor is 50M (or 50 million pixels) and the zoom ratio is 2×, then after the sensor performs image output in the non-binning mode, cropping of a 2× field of view (FOV) still needs to be performed, to obtain a 12.5M image.

The first buffer is configured to store the first image data outputted by the camera, so that data of a photographing frame can be obtained from the first buffer at the first time after a photographing command is triggered.

The first image processing module is configured to process image data of a photographing path. The first image processing module includes the postprocessing algorithm module, an ISP first module, an ISP second module, and an ISP third module.

The postprocessing algorithm module may be configured to process an image offline in a photographing mode, to improve an image effect. For example, the postprocessing algorithm module is configured to perform one or more of the following processing on the image: multi-frame fusion noise reduction processing, multi-frame HDR processing, and the like.

As shown in FIG. 3, in the first mode, for the preview stream, a data stream passes through an ISP first module, an ISP second module, and an ISP third module. The ISP first module is configured to remosaic the first image data. The ISP second module is configured to process a Bayer field and output data in an RGB format. The ISP third module is configured to process an RGB field or a YUV field and output data in a YUV format.

Further processing functions that may be included in the ISP first module, the ISP second module, and the ISP third module are described below. Here is a unified explanation. When the ISP first module, the ISP second module, and the ISP third module are enabled, the following related description of the further processing functions of the ISP first module, the ISP second module, and the ISP third module is also applicable to other modes (a second mode and a third mode below) or other paths (the photographing stream and the thumbnail stream). The further processing functions of the ISP first module, the ISP second module, and the ISP third module are not described again in a place below that the modules appear.

Optionally, the ISP first module further includes one or more of the following processing: binning, HDR fusion, and the like.

Optionally, the ISP second module further includes one or more of the following processing: bad pixel correction (bad pixel correction, BPC), black level correction (black level correction, BLC), lens shade correction (lens shade correction, LSC), automatic white balance (automatic white balance, AWB), bayer field noise reduction (noise reduction, NR), Demosaic, and the like.

Optionally, the ISP third module further includes one or more of the following processing: color correct (color correct, CC), YUV field noise reduce NR, color enhancer (color enhancer, CE), sharpen (Sharpen), tone mapping (Tone Mapping), and the like.

As shown in FIG. 3, in the first mode, for the photographing stream, a data stream passes through the first buffer and the first image processing module. There may also be many passing directions for the data stream in the first image processing module. Processing after the first image data is sent to the first image processing module is not specifically limited in this embodiment of this application. In the first image processing module, the decision module may select which modules to be or not to be passed through by the data stream.

FIG. 3 shows two passing directions of the data stream in the first image processing module. In a possible implementation, as shown in FIG. 3, after being sent to the first image processing module, the first image data obtained from the first buffer is first transmitted to the postprocessing algorithm module, that is, without passing through the ISP first module, and instead, the first image data is remosaiced by the postprocessing algorithm module, and then passes through the ISP second module and the ISP third module. The ISP second module and the postprocessing algorithm module are connected through a two-way arrow (that is, there may be two-way interaction); and the ISP third module and the postprocessing algorithm module are connected through a two-way arrow.

For example, after being remosaiced by the postprocessing algorithm module, the first image data may be sent to the ISP second module for processing, and then, after processing is completed in the ISP second module, image data may be returned to the postprocessing algorithm module for processing or may be sent to the ISP third module for processing; and then, after processing is completed in the postprocessing algorithm module, image data may be sent to the ISP third module for processing, and finally, after processing is completed in the ISP third module, image data may be returned to the postprocessing algorithm module for further processing, which helps to improve image quality.

Because a noise model is not destroyed when the first image data (whose format is quadra raw) is sent to the postprocessing algorithm module, the postprocessing algorithm module may perform noise reduction based on the first image data. In this way, a better noise reduction effect can be achieved through noise modeling. Compared with sending the first image data into an ISP or a camera for remosaicing, a better noise reduction effect can be achieved in this way, which is conducive to improving definition of a photographed image and improving shooting experience of a user.

In another possible implementation, as shown in FIG. 3, after being sent to the first image processing module, the first image data is first transmitted to the ISP first module. The ISP first module remosaics the first image data; and then image data obtained after processing by the ISP first module is sent to the postprocessing algorithm module; and then, after processing is completed, the postprocessing algorithm module may transmit processed image data to the ISP second module, and then, after processing is completed, the ISP second module may return image data to the postprocessing algorithm module for processing or may transmit to the ISP third module for processing; and then, after processing is completed in the postprocessing algorithm module, image data may be sent to the ISP third module for processing, and finally, after processing is completed in the ISP third module, image data may be returned to the postprocessing algorithm module for further processing, which helps to improve image quality.

As shown in FIG. 3, in the first mode, for the thumbnail stream, a data stream passes through a first buffer, an ISP first module, an ISP second module, and an ISP third module. The ISP first module is configured to remosaic the first image data, and a format of obtained image data is bayer raw. Bayer raw obtained after processing by the ISP first module may be further processed by using the ISP second module and the ISP third module. The ISP second module is configured to process a Bayer field and output data in an RGB format. The ISP third module is configured to process an RGB field or a YUV field and output data in a YUV format.

It is to be noted that, because an image production speed for a thumbnail needs to be ensured, the thumbnail stream has a lower requirement for image definition than the photographing stream, and for the thumbnail stream, there is no need to process an image by using the postprocessing algorithm module.

In embodiments of this application, a post-path processing procedure is designed for the first mode, and specifically relates to a preview stream, a photographing stream, and a thumbnail stream. A procedure of photographing by using the photographing system 300 shown in FIG. 3 is described below with reference to FIG. 4.

Figure 4:
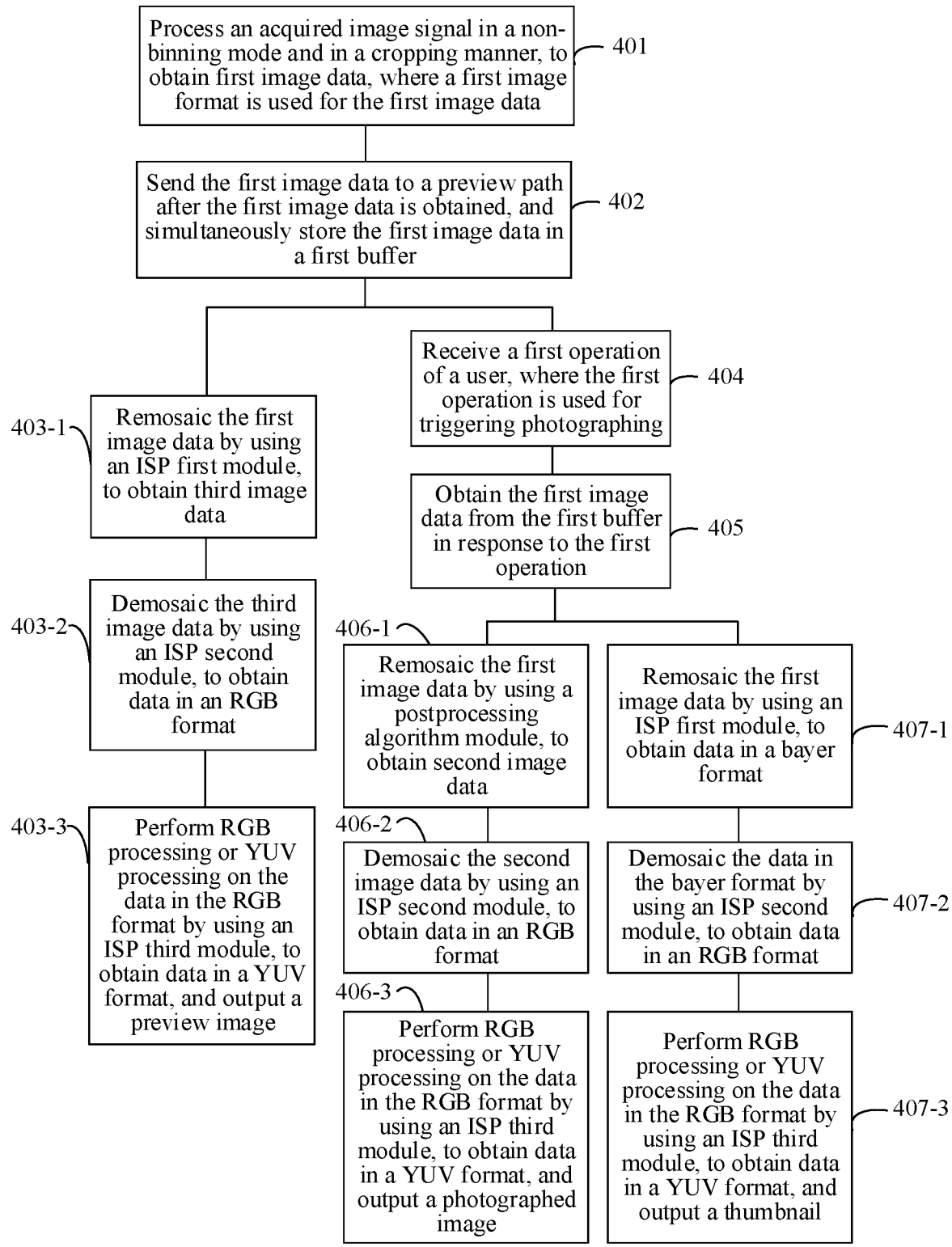
FIG. 4 is a schematic flowchart of a photographing method according to an embodiment of this application.

FIG. 4 is a schematic flowchart of a photographing method in a first mode. As shown in FIG. 4, the photographing method in the first mode includes the following steps.

Step 401: Process an acquired image signal in a non-binning mode and in a cropping manner, to obtain first image data, where a first image format is used for the first image data.

Specifically, a sensor performs image output for the acquired image signal in the non-binning mode, and performs cropping (for example, through a crop function) based on the image in a quadra raw format, to obtain a quadra raw image.

Step 402: Send the first image data to a preview path after the first image data is obtained, and simultaneously store the first image data in a first buffer.

The first buffer is configured to save data of a photographing frame. After a photographing command is triggered, the data of the photographing frame may be obtained from the first buffer to be returned to a user.

For example, the first buffer is a zero shutter lag (zero shutter lag, ZSL) buffer (buffer). The ZSL buffer is configured to store image data directly outputted by the sensor. In a ZSL mode, after the photographing command is delivered, the system selects image data of a corresponding frame from the ZSL buffer and sends the image data to a photographing stream and a thumbnail stream for processing.

Step 403-1: Remosaic the first image data by using an ISP first module, to obtain third image data, and send the third image data to an ISP second module. A second image format (bayer raw) is used for the third image data.

That is, a format of the image outputted by the sensor is a quadra raw format, and an image in a bayer raw format is obtained after processing by the ISP first module.

Step 403-2: Demosaic the third image data by using the ISP second module, to obtain data in an RGB format.

Step 403-3: Perform RGB processing or YUV processing on the data in the RGB format by using an ISP third module, to obtain data in a YUV format, and output a preview image.

The foregoing steps 403-1 to 403-3 describe a workflow of a preview stream in the first mode. Image quality of the preview image can be improved through the foregoing procedure.

Step 404: Receive a first operation of the user, where the first operation is used for triggering photographing.

The first operation is the photographing command. A specific form of the first operation is not specifically limited in this embodiment of this application, for example, the first operation is to manually tap a shooting control, or the first operation is to control a mobile phone through voice for photographing, or the first operation is to turn on a photographing function at a scheduled time (for example, automatically perform photographing in 3 seconds). For example, the first operation is an operation that the user taps the shooting control 14 shown in FIG. 1B, FIG. 1C, or FIG. 1D.

Step 405: Obtain the first image data from the first buffer in response to the first operation.

After the photographing command is received, an image frame corresponding to a photographing timestamp needs to be taken from the first buffer. For example, data of the image frame is the first image data.

Step 406-1: Remosaic the first image data by using a postprocessing algorithm module, to obtain second image data. A second image format (bayer raw) is used for the second image data.

Step 406-2: Demosaic the second image data by using an ISP second module, to obtain data in an RGB format.

Step 406-3: Perform RGB processing or YUV processing on the data in the RGB format by using an ISP third module, to obtain data in a YUV format, and output a photographed image.

The foregoing steps 404 to 406-3 describe a workflow of a photographing stream in the first mode. During processing of a photographing path, compared with sending the first image data into an ISP or a camera for remosaicing, using the postprocessing algorithm module to remosaic the first image data can achieve a better noise reduction effect, and helps to improve the definition of the photographed image.

In addition, in the photographing path, remosaicing may be performed by an ISP first module. Optionally, the foregoing step 406-1 may be replaced with: Remosaic the first image data by using an ISP first module, to obtain second image data. A second image format (bayer Raw) is used for the second image data. Correspondingly, step 406-2 and step 406-3 may be correspondingly adjusted. For example, step 406-2 is replaced with: Perform image processing on the second image data by using the postprocessing algorithm module, and send image data obtained after processing by the postprocessing algorithm module to an ISP second module for processing; and step 406-3 is replaced with: Process, by using an ISP third module, image data outputted by the ISP second module, and output a photographed image. A specific manner in which the postprocessing algorithm module, the ISP second module, or the ISP third module processes the image data is not limited, and reference may be made to the foregoing description.

Step 407-1: Remosaic the first image data by using an ISP first module in a thumbnail stream, to obtain data in a bayer format.

Step 407-2: Demosaic the data in the bayer format by using an ISP second module, to obtain data in an RGB format.

Step 407-3: Perform RGB processing or YUV processing on the data in the RGB format by using an ISP third module, to obtain data in a YUV format, and output a thumbnail.

The foregoing step 404, step 405, and steps 407-1 to 407-3 describe a workflow of a thumbnail stream in the first mode. The foregoing steps help to improve image quality of the thumbnail.

A relevant design of a second mode is described below with reference to FIG. 5. FIG. 5 is a schematic block diagram of a photographing system 500 according to an embodiment of this application. Content included in the photographing system 500 in FIG. 5 is the same as that included in the photographing system 300 in FIG. 3. A module included in the photographing system 500 is not described herein again. A difference between the second mode and the first mode lies in at least the following aspect: the sensor performs image output in different manners, specifically, that is, in the second mode, the sensor performs image output in the binning mode; and additionally, in the second mode, the ISP third module or the postprocessing algorithm module needs to perform cropping and upsampling based on the zoom ratio.

As a possible implementation, in the following two cases: (1) the zoom ratio is greater than the second ratio and less than the first ratio, and the environmental illuminance is the high-illuminance scene; and (2) the zoom ratio is greater than the second ratio, and the environmental illuminance is the low-illuminance scene, the decision module determines at least the following parameter configuration: a manner in which the camera performs image output is the binning mode, image processing of the ISP third module in the preview path includes cropping and upsampling, and image processing of the postprocessing algorithm module or the ISP third module in the photographing path includes cropping and upsampling.

It is to be noted that, to improve the signal-to-noise ratio (or ensure good sensitivity in a dark light), in the second mode, the sensor performs image output in the binning mode, to obtain fourth image data, where a second image format is used for the fourth image data. The second image format is bayer raw. After the fourth image data is obtained, the fourth image data is sent to a preview path, and the fourth image data is simultaneously stored in a first buffer. For description of the first buffer, reference may be made to the foregoing description, and details are not described herein again.

For example, in a dark light in which the zoom ratio is greater than 1×, to improve the signal-to-noise ratio, the sensor performs image output in the binning mode, to obtain bayer raw. In addition, the image needs to be cropped according to the zoom ratio, to obtain an image of a field of view corresponding to the zoom ratio. Finally, a size of an outputted image (an outputted preview image or an outputted photographed image) is to be consistent with a 1× size, so that a cropped image further needs to be upsampled.

In the same way, processing procedures of a preview stream, a photographing stream, and a thumbnail stream are also involved in the second mode. A data passing direction in FIG. 5 is used for example description.

Figure 5:
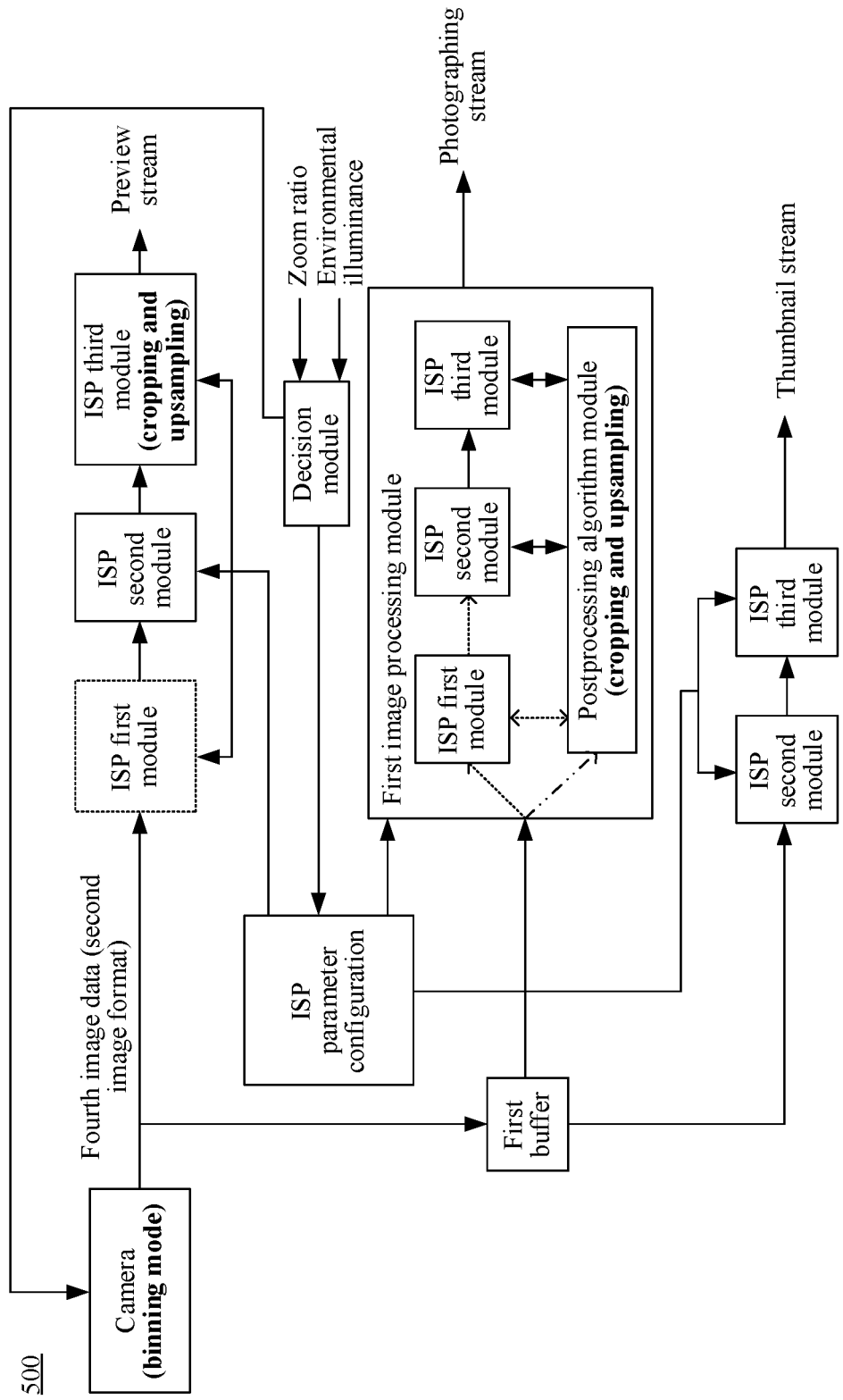
FIG. 5 is a schematic block diagram of another photographing system according to an embodiment of this application.

A data passing direction of a preview stream in FIG. 5 is the same as a data passing direction of the preview stream in FIG. 3. A difference between the two is at least that in FIG. 5, an ISP first module does not need to process image data obtained from the sensor, in other words, image data is to be transmitted to an ISP second module after passing through an ISP first module; and an ISP third module is configured to crop and upsample an image, to ensure that resolution of a preview image remains unchanged.

A data passing direction of a photographing stream in FIG. 5 is the same as a data passing direction of the photographing stream in FIG. 3. First image processing modules in FIG. 5 and FIG. 3 include a same module. Similarly, there may also be many passing directions for a data stream in the first image processing module in FIG. 5. A difference between the two is at least that in FIG. 5, processing in a postprocessing algorithm module or an ISP third module includes cropping and upsampling, to ensure that resolution of a photographed image remains unchanged.

As shown in FIG. 5, in the second mode, for the thumbnail stream, a data stream passes through a first buffer, an ISP second module, and an ISP third module. A reason why the data stream herein does not need to pass through an ISP first module is that a format of image data obtained from the first buffer is a second image format, namely, bayer raw, so there is no need for processing of the ISP first module to obtain bayer raw. In addition, the thumbnail stream herein is processed offline, so the ISP second module and the ISP third module may be invoked to process an image. Moreover, the ISP third module is configured to crop and upsample an image, to ensure that resolution of a thumbnail image remains unchanged.

In embodiments of this application, a post-path processing procedure is designed for the second mode, and specifically relates to a preview stream, a photographing stream, and a thumbnail stream. A procedure of photographing by using the photographing system 500 shown in FIG. 5 is described below with reference to FIG. 6.

Figure 6:
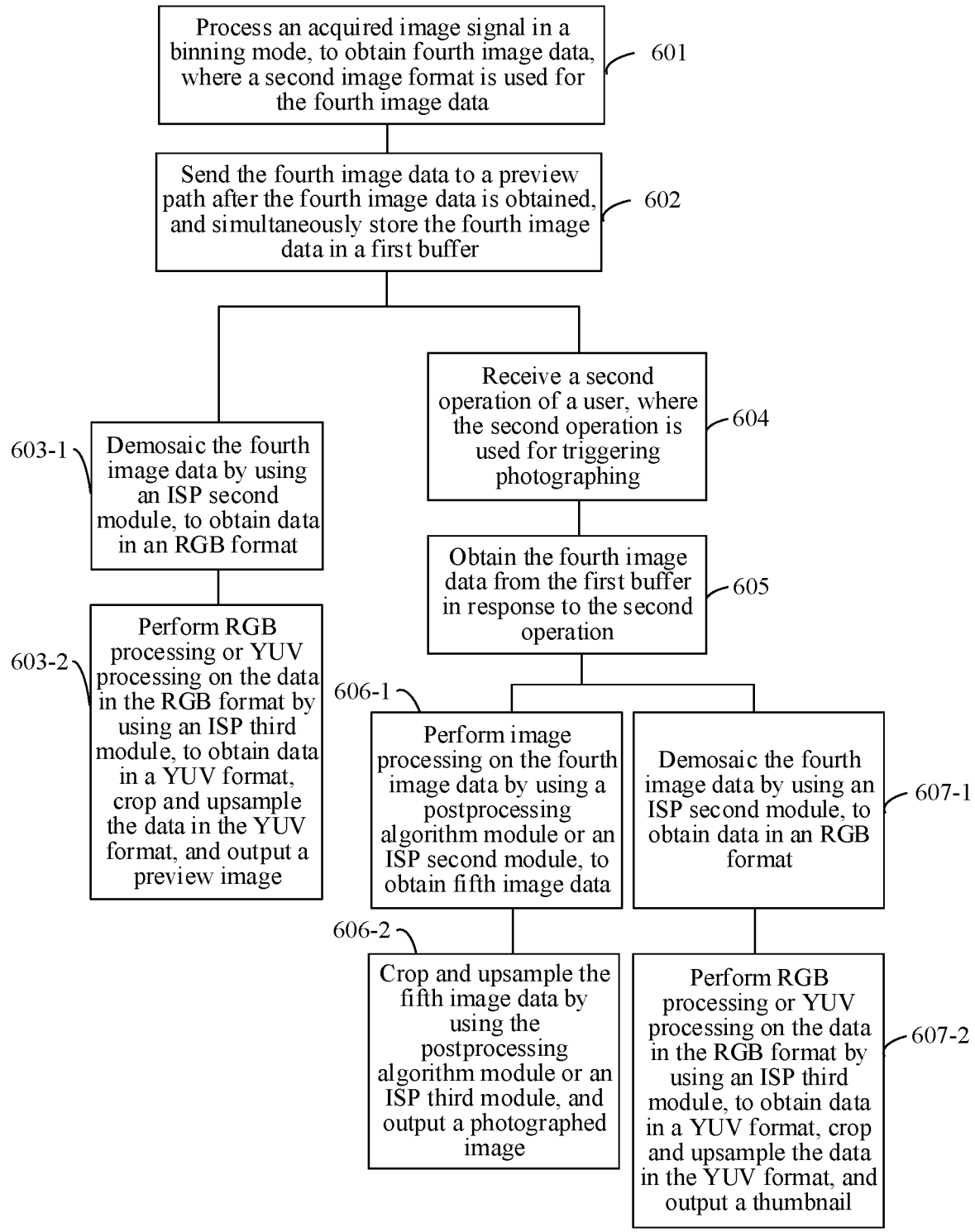
FIG. 6 is a schematic flowchart of another photographing method according to an embodiment of this application.

FIG. 6 is a schematic flowchart of a photographing method in a second mode. As shown in FIG. 6, the photographing method in the second mode includes the following steps.

Step 601: Process an acquired image signal in a binning mode, to obtain fourth image data, where a second image format is used for the fourth image data. The second image format is bayer raw.

That is, a sensor performs image output in the binning mode, to output a bayer raw image, for example, the fourth image data. The fourth image data may be sent to a preview path for processing, or may be stored in a first buffer for ease of being subsequently invoked by a photographing path.

Step 602: Send the fourth image data to a preview path after the fourth image data is obtained, and simultaneously store the fourth image data in a first buffer.

For specific description of the first buffer, reference may be made to the foregoing description, and details are not described herein again.

Step 603-1: Demosaic the fourth image data by using an ISP second module, to obtain data in an RGB format.

Step 603-2: Perform RGB processing or YUV processing on the data in the RGB format by using an ISP third module, to obtain data in a YUV format, crop and upsample the data in the YUV format, and output a preview image.

The foregoing steps 603-1 and 603-2 describe a workflow of a preview stream in the second mode. Quality of the preview image in the second mode can be improved through the foregoing steps.

Step 604: Receive a second operation of a user, where the second operation is used for triggering photographing.

The second operation is a photographing command. For description of the second operation, reference may be made to the foregoing description of the first operation, and details are not described herein again.

Step 605: Obtain the fourth image data from the first buffer in response to the second operation.

Step 606-1: Perform image processing on the fourth image data by using a postprocessing algorithm module or an ISP second module, to obtain fifth image data.

For example, perform Bayer field processing on the fourth image data by using the postprocessing algorithm module or the ISP second module, to obtain data in an RGB format. It may be understood that, the postprocessing algorithm module or the ISP second module may also perform another image processing. Reference may be made to the foregoing description, and details are not described herein again.

Step 606-2: Crop and upsample the fifth image data by using the postprocessing algorithm module or an ISP third module, and output a photographed image.

Optionally, the postprocessing algorithm module or the ISP third module may further perform RGB field processing, YUV field processing, or the like on the fifth image data.

The foregoing steps 604 to 606-2 describe a workflow of a photographing stream in the second mode. Quality of the photographed image in the second mode can be improved through the foregoing steps.

Step 607-1: Demosaic the fourth image data by using an ISP second module, to obtain data in an RGB format.

Step 607-2: Perform RGB processing or YUV processing on the data in the RGB format by using an ISP third module, to obtain data in a YUV format, crop and upsample the data in the YUV format, and output a thumbnail.

The foregoing steps 607-1 and 607-2 describe a workflow of a thumbnail stream in the second mode. Quality of the thumbnail in the second mode can be improved through the foregoing steps.

A relevant design of a third mode is described below with reference to FIG. 7. FIG. 7 is a schematic block diagram of a photographing system 700 according to an embodiment of this application. Content included in the photographing system 700 in FIG. 7 is the same as that included in the photographing system 500 in FIG. 5. A module included in the photographing system 700 is not described herein again. A difference between the third mode and the second mode lies in at least the following aspect: in the third mode, the ISP third module or the postprocessing algorithm module does not need to perform cropping and upsampling based on the zoom ratio.

Figure 7:
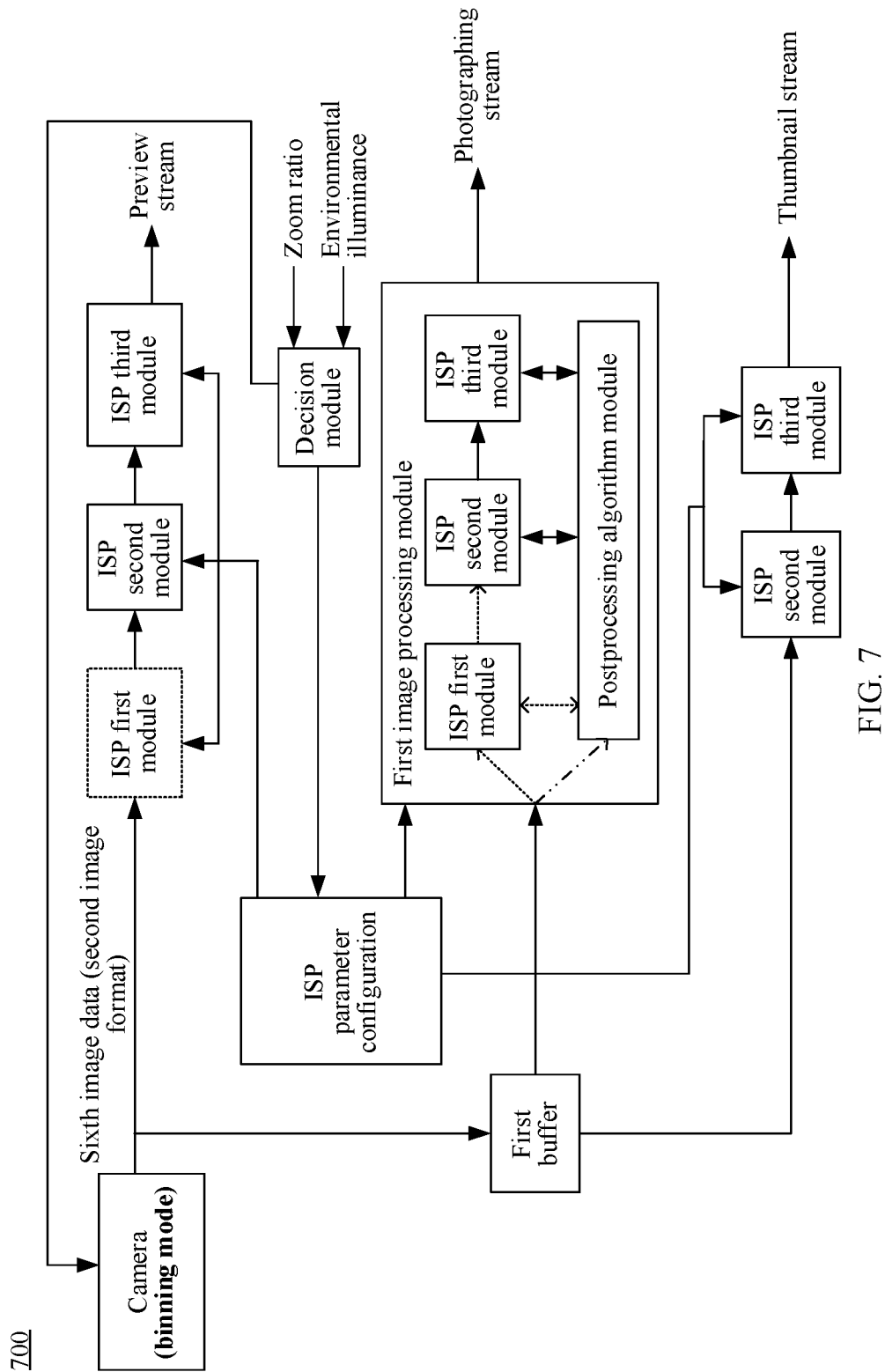
FIG. 7 is a schematic block diagram of still another photographing system according to an embodiment of this application.

As a possible implementation, in a full scene (including a high-illuminance scene and a low-illuminance scene) in which the zoom ratio is equal to the second ratio, the decision module determines at least the following parameter configuration: a manner in which the camera performs image output is the binning mode As shown in FIG. 7, a sensor performs image output in the binning mode, to obtain sixth image data, where a second image format (bayer raw) is used for the sixth image data. After the sixth image data is obtained, the sixth image data is sent to a preview path, and the sixth image data is simultaneously stored in a first buffer. For description of the first buffer, reference may be made to the foregoing description, and details are not described herein again.

For example, the second ratio is 1×, and there is no loss in resolution in a 1× scene, so that a resolution requirement for an image can be satisfied, and definition of the outputted image is ensured; and additionally, because a signal-to-noise ratio of an image and an image effect in a low-illuminance scene can be improved in the binning mode, in a 1× full scene, image output may be performed in the binning mode and the image has a good signal-to-noise ratio.

In the same way, processing procedures of a preview stream, a photographing stream, and a thumbnail stream are also involved in the third mode. A data passing direction in FIG. 7 is used for example description.

A data passing direction of a preview stream in FIG. 7 is the same as a data passing direction of the preview stream in FIG. 5. A difference between the two is at least that in FIG. 7, the ISP third module does not need to crop and upsample an image.

A data passing direction of a photographing stream in FIG. 7 is the same as a data passing direction of the photographing stream in FIG. 5. First image processing modules in FIG. 7 and FIG. 5 include a same module. Similarly, there may also be many passing directions for a data stream in the first image processing module in FIG. 5. A difference between the two is at least that in FIG. 7, the postprocessing algorithm module or the ISP third module does not need to crop and upsample an image.

A data passing direction of a thumbnail stream in FIG. 7 is the same as a data passing direction of the thumbnail stream in FIG. 5. In FIG. 7, a data stream passes through a first buffer, an ISP second module, and an ISP third module. A reason why the data stream herein does not need to pass through an ISP first module is that a format of image data obtained from the first buffer is a second image format, namely, bayer raw, so there is no need for processing of the ISP first module to obtain bayer raw. In addition, the thumbnail stream herein is processed offline, so the ISP second module and the ISP third module may be invoked to process an image. Moreover, the ISP third module does not need to crop and upsample the image.

In embodiments of this application, a post-path processing procedure is designed for the third mode, and specifically relates to a preview stream, a photographing stream, and a thumbnail stream. A procedure of photographing by using the photographing system 700 shown in FIG. 7 is described below with reference to FIG. 8.

Figure 8:
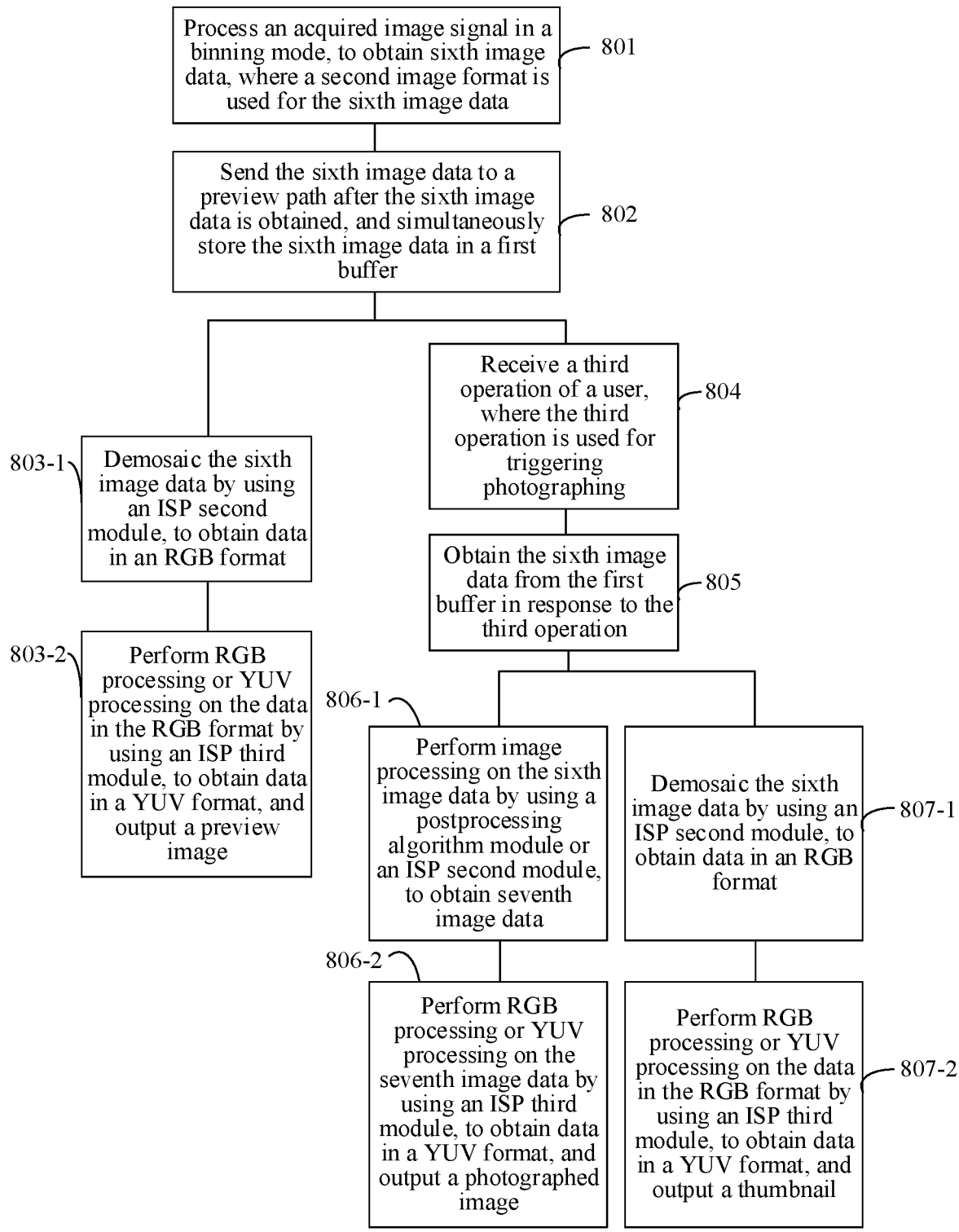
FIG. 8 is a schematic flowchart of still another photographing method according to an embodiment of this application.

FIG. 8 is a schematic flowchart of a photographing method in a third mode. As shown in FIG. 8, the photographing method in the third mode includes the following steps.

Step 801: Process an acquired image signal in a binning mode, to obtain sixth image data, where a second image format is used for the sixth image data. The second image format is bayer raw.

Step 802: Send the sixth image data to a preview path after the sixth image data is obtained, and simultaneously store the sixth image data in a first buffer.

Step 803-1: Demosaic the sixth image data by using an ISP second module, to obtain data in an RGB format.

Step 803-2: Perform RGB processing or YUV processing on the data in the RGB format by using an ISP third module, to obtain data in a YUV format, and output a preview image.

The foregoing steps 803-1 and 803-2 describe a workflow of a preview stream in the third mode. Quality of the preview image in the third mode can be improved through the foregoing steps.

Step 804: Receive a third operation of a user, where the third operation is used for triggering photographing.

The third operation is a photographing command. For description of the third operation, reference may be made to the foregoing description of the first operation, and details are not described herein again.

Step 805: Obtain the sixth image data from the first buffer in response to the third operation.

Step 806-1: Perform image processing on the sixth image data by using a postprocessing algorithm module or an ISP second module, to obtain seventh image data.

For example, perform bayer field processing on the sixth image data by using the postprocessing algorithm module or the ISP second module, to obtain data in an RGB format. It may be understood that, the postprocessing algorithm module or the ISP second module may also perform another image processing. Reference may be made to the foregoing description, and details are not described herein again.

Step 806-2: Perform RGB processing or YUV processing on the seventh image data by using an ISP third module, to obtain data in a YUV format, and output a photographed image.

The foregoing steps 804 to 808-2 describe a workflow of a photographing stream in the third mode. Quality of the photographed image in the third mode can be improved through the foregoing steps.

Step 807-1: Demosaic the sixth image data by using an ISP second module, to obtain data in an RGB format.

Step 807-2: Perform RGB processing or YUV processing on the data in the RGB format by using an ISP third module, to obtain data in a YUV format, and output a thumbnail.

The foregoing steps 807-1 and 807-2 describe a workflow of a thumbnail stream in the third mode. Quality of the thumbnail in the third mode can be improved through the foregoing steps.

In the foregoing three modes, a manner in which the sensor performs image output may be the binning mode, or may be the non-binning+cropping mode. Switching between manners in which the sensor performs image output does not require stream stopping-starting; and a size and bit width of an image input to an ISP module always remain unchanged, so that ISP hardware does not need stream stopping-starting, thereby implementing seamless switching between the three modes. Stream stopping-starting is processing of the ISP hardware stopping a data stream and then restarting the data stream. Shown on an interface, stream stopping-starting may cause a phenomenon that a screen appears black or white or lagging, which is not good for user experience. Therefore, a phenomenon of stream stopping-starting needs to be avoided.

It may be understood that, the photographing systems shown in FIG. 3, FIG. 5, and FIG. 7 are only example description, and the embodiments of this application are not limited thereto.

It may be further understood that the procedures of the photographing methods shown in FIG. 4, FIG. 6, and FIG. 8 are only example description, and do not constitute a limitation to the protection scope of the embodiments of this application.

A software system and a hardware architecture that are used in the embodiments of this application are described below with reference to FIG. 9 and FIG. 10.

Figure 9:
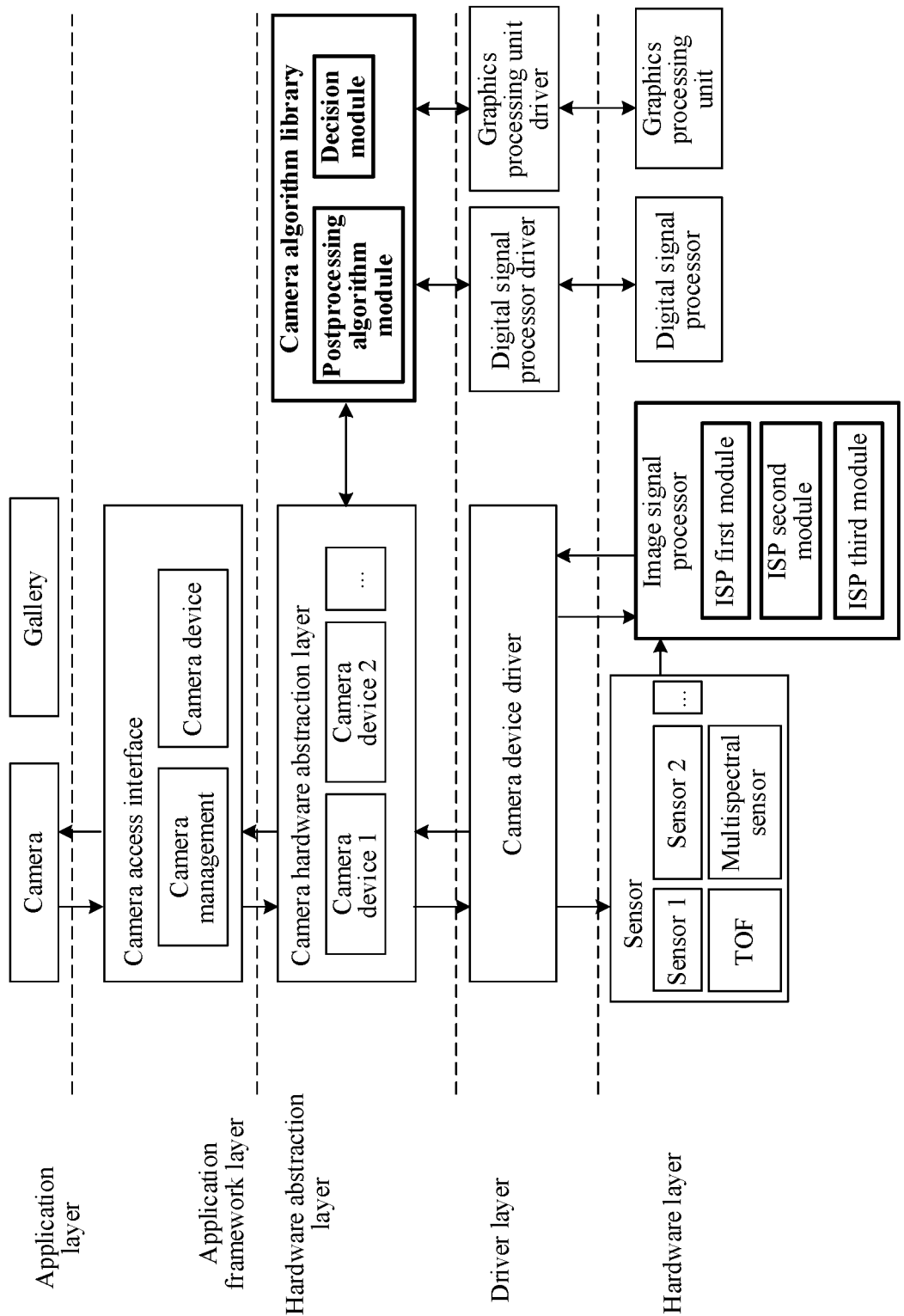
FIG. 9 is a schematic diagram of an architecture used in an embodiment of this application.

FIG. 9 is a schematic diagram of an architecture (including a software system and some hardware) used in an embodiment of this application. As shown in FIG. 9, an application architecture is divided into several layers, and each layer has a clear role and task. The layers communicate with each other through a software interface. In some embodiments, the application architecture may be divided into five layers, which are an application layer, an application framework layer, a hardware abstraction layer HAL, a driver layer (driver), and a hardware layer from top to bottom.

As shown in FIG. 9, the application layer includes a camera and a gallery. It may be understood that, FIG. 9 shows a part of application programs. In fact, the application layer may further include another application program, which is not limited in this application. For example, the application layer further includes application programs such as Message, Alarm clock, Weather, Stopwatch, Compass, Timer, Flashlight, Calendar, and Alipay.

As shown in FIG. 9, the application framework layer includes a camera access interface. The camera access interface includes camera management and a camera device. The hardware abstraction layer includes a camera hardware abstraction layer and a camera algorithm library. The camera hardware abstraction layer includes a plurality of camera devices. The camera algorithm library includes a postprocessing algorithm module and a decision module.

It should be understood that, the decision module may be alternatively placed in another layer. As a possible implementation, the decision module may be placed in the application layer or the application framework layer.

The driver layer is configured to drive a hardware resource. The driver layer may include a plurality of driver modules. As shown in FIG. 9, the driver layer includes a camera device driver, a digital signal processor driver, a graphics processing unit driver, and the like.

The hardware layer includes a sensor, an image signal processor, a digital signal processor, and a graphics processing unit. The sensor includes a plurality of sensors, a TOF camera, and a multispectral sensor. The image signal processor includes an ISP first module, an ISP second module, and an ISP third module.

For example, a user may tap a camera application. When the user taps the camera for photographing, a photographing command may be delivered to the camera hardware abstraction layer through the camera access interface. The camera hardware abstraction layer invokes the camera device driver and invokes the camera algorithm library. The decision module in the camera algorithm library determines a photographing mode (for example, a first mode, a second mode, or a third mode) according to a zoom ratio and an environmental light, and sends a configured parameter (including a manner in which a sensor performs image output, a parameter configuration of each ISP module, and a parameter configuration of the postprocessing algorithm module) to the camera hardware abstraction layer. The camera hardware abstraction layer delivers the configured parameter from the decision module to the camera device driver. The camera device driver sends the configured parameter delivered by the camera hardware abstraction layer to the hardware layer, for example, sends the manner in which a sensor performs image output to the sensor, and sends the parameter configuration of each ISP module to the image signal processor. The sensor performs image output based on the manner in which a sensor performs image output. The image signal processor performs corresponding processing based on the parameter configuration of each ISP module. The camera algorithm library is further configured to deliver a digital signal to the digital signal processor driver in the driver layer, so that the digital signal processor driver invokes the digital signal processor in the hardware layer for digital signal processing. The digital signal processor may return a processed digital signal to the camera algorithm library through the digital signal processor driver. The camera algorithm library is further configured to deliver a digital signal to a graphics signal processor driver in the driver layer, so that the graphics signal processor driver invokes the graphics processing unit in the hardware layer for digital signal processing. The graphics processing unit may return processed graphics data to the camera algorithm library through the graphics processing unit driver.

In addition, an image outputted by the image signal processor may be sent to the camera device driver. The camera device driver may send the image outputted by the image signal processor to the camera hardware abstraction layer. The camera hardware abstraction layer may send the image to the postprocessing algorithm module for further processing, or may send the image to the camera access interface. The camera access interface may send the image returned from the camera hardware abstraction layer to the camera.

The foregoing describes the software system used in this embodiment of this application in detail. A hardware system of an electronic device 1000 is described below with reference to FIG. 10.

Figure 10:
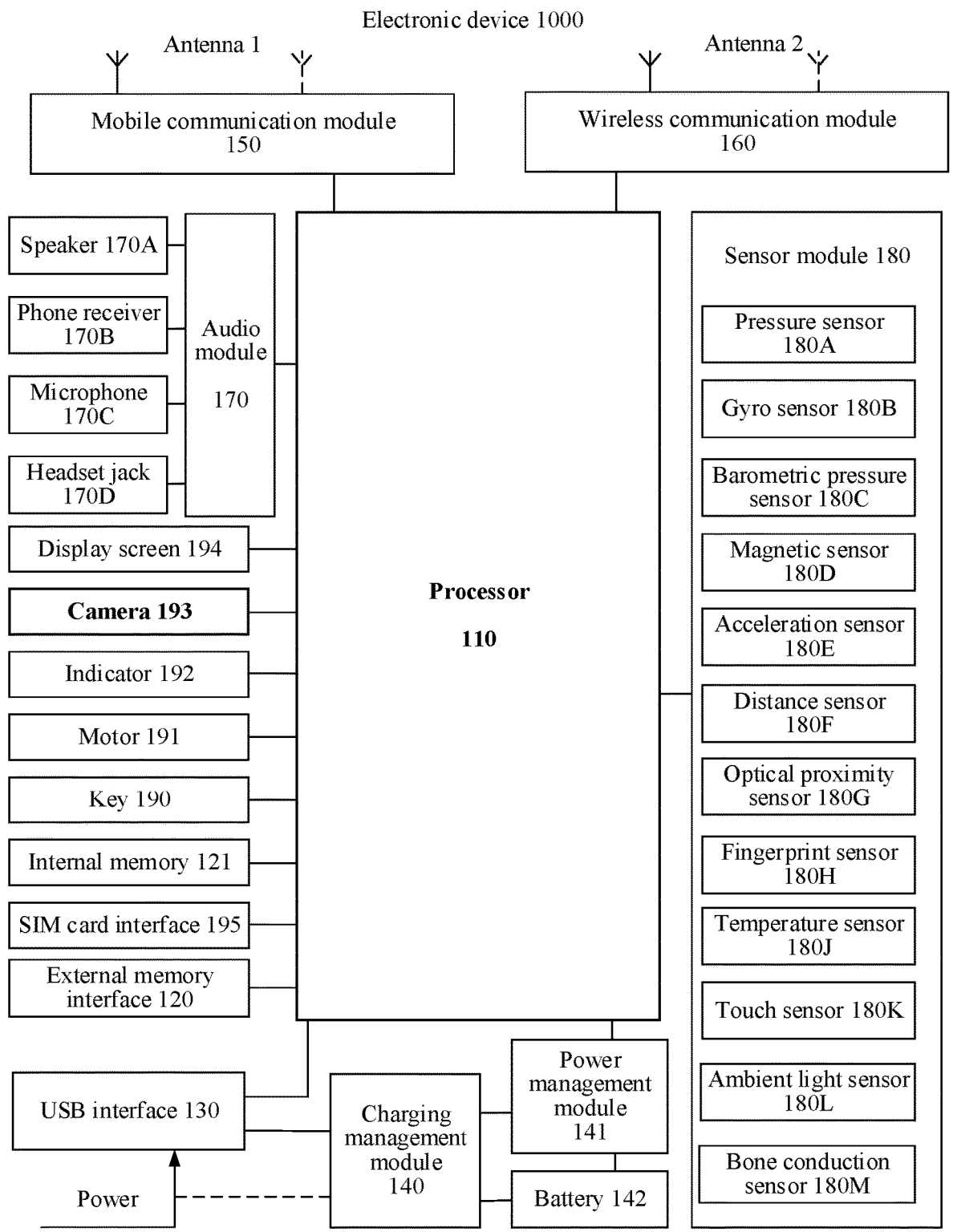
FIG. 10 is a schematic structural diagram of an electronic device applicable to this application.

FIG. 10 is a schematic structural diagram of an electronic device 1000 applicable to this application.

The electronic device 1000 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a phone receiver 170B, a microphone 170C, a headset jack 170D, a sensor module 180, a key 190, a motor 191, an indicator 192, a camera 193, a display screen 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It is to be noted that, the structure shown in FIG. 10 does not constitute a specific limitation on the electronic device 1000. In some other embodiments of this application, the electronic device 1000 may include more or fewer components than the components shown in FIG. 10, or, the electronic device 1000 may include a combination of some components in the components shown in FIG. 10, or, the electronic device 1000 may include subcomponents of some components in the components shown in FIG. 10. For example, the optical proximity sensor 180G shown in FIG. 10 may be optional. The components shown in FIG. 10 may be implemented by hardware, software, or a combination of software and hardware.

The processor 110 may include one or more processing units. For example, the processor 110 may include at least one of the following processor units: an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and a neural-network processing unit (neural-network processing unit, NPU). Different processing units may be independent components, or may be integrated components.

The controller may generate an operating control signal according to an instruction operation code and a sequence signal, to complete control of fetching and executing instructions.

A memory may be further disposed in the processor 110, and is configured to store instructions and data. In some embodiments, the memory in the processor 110 is a cache memory. The memory may store instructions or data that has just been used or recycled by the processor 110. If the processor 110 needs to reuse the instructions or the data, the processor 110 may directly invoke the instructions or the data from the memory, which avoids repeated access, and reduces a waiting time of the processor 110, thereby improving system efficiency.

In some embodiments, the processor 110 may include one or more interfaces. For example, the processor 110 may include at least one of the following interfaces: an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a SIM interface, and a USB interface.

A connection relationship among the modules shown in FIG. 10 is merely an example for description, and constitutes no limitation on the connection relationship among the modules of the electronic device 1000. Optionally, the modules of the electronic device 1000 may alternatively use a combination of a plurality of connection manners in the foregoing embodiment.

The charging management module 140 is configured to receive power from a charger. The charger may be a wireless charger, or may be a wired charger. In some embodiments of wired charging, the charging management module 140 may receive a current of a wired charger through the USB interface 130. In some embodiments of wireless charging, the charging management module 140 may receive an electromagnetic wave (a current path is shown in dashed lines) through a wireless charging coil of the electronic device 1000. When charging the battery 142, the charging management module 140 may further supply power to the electronic device 1000 through the power management module 141.

The power management module 141 is configured to be connected to the battery 142, the charging management module 140, and the processor 110. The power management module 141 receives input of the battery 142 and/or the charging management module 140, and supplies power for the processor 110, the internal memory 121, the display screen 194, the camera 193, the wireless communication module 160, and the like. The power management module 141 may be further configured to monitor parameters such as a battery capacity, a cycle count of a battery, and a battery health state (for example, leakage and impedance). Optionally, the power management module 141 may be disposed in the processor 110, or the power management module 141 and the charging management module 140 may be disposed in a same device.

A wireless communication function of the electronic device 1000 may be implemented by using the antenna 1, the antenna 2, the mobile communication module 150, the wireless communication module 160, the modem processor, the baseband processor, and the like.

The electronic device 1000 implements a display function by using the GPU, the display screen 194, and the application processor. The GPU is a microprocessor for image processing, and is connected to the display screen 194 and the application processor. The GPU is configured to perform mathematical and geometric calculation, and is configured to render a graphic. The processor 110 may include one or more GPUs, and execute program instructions to generate or change display information.

The display screen 194 may be configured to display an image or a video. The display screen 194 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flex light-emitting diode (flex light-emitting diode, FLED), a mini light-emitting diode (mini light-emitting diode, Mini LED), a micro light-emitting diode (micro light-emitting diode, Micro LED), a micro OLED (Micro OLED), or quantum dot light emitting diodes (quantum dot light emitting diodes, QLED). In some embodiments, the electronic device 1000 may include 1 or N display screens 194. N is a positive integer greater than 1.

The electronic device 1000 may implement a shooting function by using the ISP, the camera 193, the video codec, the GPU, the display screen 194, the application processor, and the like.

The ISP is configured to process data fed back by the camera 193. For example, during photographing, a shutter is enabled. Light is transferred to a photosensitive element of the camera through a lens, and an optical signal is converted into an electrical signal. The photosensitive element of the camera transfers the electrical signal to the ISP for processing, and the electrical signal is converted into an image visible to a naked eye. The ISP may optimize an algorithm for noise, brightness, and colors of the image, and may further optimize parameters, such as exposure and color temperature, of a shooting scene. In some embodiments, the ISP may be disposed in the camera 193.

The camera 193 is configured to capture a static image or a video. An optical image of an object is generated through a lens and is projected onto a photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transfers the electrical signal to the ISP, to convert the electrical signal into a digital image signal. The ISP outputs the digital image signal to the DSP for processing. The DSP converts the digital image signal into a standard image signal in a standard format such as RGB (red green blue, RGB) or YUV. In some embodiments, the electronic device 1000 may include 1 or N cameras 193, and N is a positive integer greater than 1.

The digital signal processor is configured to process a digital signal, and may further process another digital signal in addition to a digital image signal. For example, when the electronic device 1000 performs frequency selection, the digital signal processor is configured to perform Fourier transform and the like on frequency energy.

The video codec is configured to compress or decompress a digital video. The electronic device 1000 may support one or more video codecs. In this way, the electronic device 1000 may play or record videos in a plurality of encoding formats, for example, moving picture experts group (moving picture experts group, MPEG) 1, MPEG 2, MPEG 3, and MPEG 4.

The NPU is a processor referring to a biological neural network structure such as a mode of transmission between human-brain nerve cells to quickly process input information, and may further constantly perform self-learning. A function such as intelligent cognition of the electronic device 1000, such as image recognition, facial recognition, voice recognition, and text understanding, may be implemented by using the NPU.

The electronic device 1000 may implement an audio function, for example, music playback or recording, by using the audio module 170, the speaker 170A, the phone receiver 170B, the microphone 170C, the headset jack 170D, the application processor, and the like.

The distance sensor 180F is configured to measure a distance. The electronic device 1000 may measure a distance through infrared light or laser. In some embodiments, for example, in a shooting scene, the electronic device 1000 may measure a distance by using the distance sensor 180F to implement quick focusing.

The ambient light sensor 180L is configured to perceive a luminance of ambient light. The electronic device 1000 may adaptively adjust a luminance of the display screen 194 according to the perceived luminance of ambient light. The ambient light sensor 180L may be further configured to automatically adjust white balance during photographing. The ambient light sensor 180L may further cooperate with the optical proximity sensor 180G to detect whether the electronic device 1000 is in a pocket, to prevent an accidental touch.

The fingerprint sensor 180H is configured to acquire a fingerprint. The electronic device 1000 may implement a function such as unlock, application lock accessing, photographing, call answering, or the like by using a feature of the acquired fingerprint.

The touch sensor 180K is also referred to as a touch control device. The touch sensor 180K may be disposed in the display screen 194, and the touch sensor 180K and the display screen 194 constitute a touchscreen, and the touchscreen is also referred to as a touch control screen. The touch sensor 180K is configured to detect a touch operation on or near the touch sensor 180K. The touch sensor 180K may transfer the detected touch operation to the application processor to determine a touch event type. The touch sensor 180K may provide a visual output related to the touch operation by using the display screen 194. In some other embodiments, the touch sensor 180K may alternatively be disposed on a surface of the electronic device 1000, and is located on a position different from that of the display screen 194.

The key 190 includes a power key and a volume key. The key 190 may be a mechanical key or a touch key. The electronic device 1000 may receive a key input signal and implement a function related to a case input signal.

The motor 191 may generate vibration. The motor 191 may be configured to provide an incoming call prompt or touch feedback. The motor 191 may generate different vibration feedback effects for touch operations performed on different application programs. The motor 191 may also generate different vibration feedback effects for touch operations performed on different regions of the display screen 194. Different application scenarios (for example, a time reminder, information receiving, an alarm clock, and a game) may also correspond to different vibration feedback effects. Customization of a touch vibration feedback effect may also be supported.

In some embodiments, the processor 110 may turn on the camera; obtain a zoom ratio and an environmental illuminance in a current photographing environment; and determine a corresponding photographing procedure according to the zoom ratio and the environmental illuminance.

In a possible implementation, the processor 110 controls the camera to perform photographing in a first mode when the zoom ratio is greater than or equal to a first ratio and the environmental illuminance is greater than or equal to a first luminance threshold, where in the first mode, the camera is configured to: process an acquired image signal in a non-binning mode and in a cropping manner, to output first image data, where a first image format is used for the first image data.

It may be understood that, the image processing method of the embodiments of this application may be applied in the electronic device shown in FIG. 10. For a specific implementation step, reference may be made to description in the foregoing method embodiments, and details are not described herein again.

It may be learned from the foregoing that, photographing is performed in the first mode in a high-zoom ratio and high-illuminance scene, image output is performed in the non-binning mode and in the cropping manner, a format of the obtained image data is quadra raw, and quadra raw is used for post-path image processing, which helps to improve image definition.

This application further provides a computer program product, where when the computer program product is executed by a processor, the method described in any method embodiment of this application is implemented.

The computer program product may be stored in a memory, and may be finally transformed, after processing processes such as preprocessing, compiling, assembling, and linking, into an executable target file that can be executed by the processor.

This application further provides a computer-readable storage medium, storing a computer program. When the computer program is executed by a computer, the method described in any method embodiment of this application is implemented. The computer program may be a high-level language program, or may be an executable target program.

The computer-readable storage medium may be a volatile memory or a non-volatile memory, or, may include a volatile memory and a non-volatile memory. The non-volatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), and is used as an external cache. Through illustrative but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

It may be clearly understood by a person skilled in the art that, for the purpose of convenient and brief description, for a detailed working process and a generated technical effect of the foregoing apparatus and device, refer to a corresponding process and technical effect in the foregoing method embodiments, and details are not described herein again.

In the several embodiments provided in this application, the disclosed system, apparatus, and method may be implemented in other manners. For example, some features of the described method embodiment may be ignored or not performed. The described apparatus embodiment is merely exemplary. The unit division is merely logical function division and may be other division in actual implementation. A plurality of units or components may be combined or integrated into another system. In addition, the coupling between units and the coupling between components may be direct coupling, or may be indirect coupling. The foregoing coupling includes connections in electrical, mechanical, or other forms.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

In conclusion, the foregoing description is merely exemplary embodiments of this application, and is not intended to limit the protection scope of this application. Any modification, equivalent replacement, improvement and the like made within the spirit and principle of this application shall fall within the protection scope of this application.

What is claimed is:

1. An image processing method, comprising:
   turning on a camera;
   obtaining a zoom ratio and an environmental illuminance in a current photographing environment; and
   performing photographing according to the following:
      performing photographing in a first mode when the zoom ratio is greater than or equal to a first ratio and the environmental illuminance is greater than or equal to a first luminance threshold, wherein in the first mode, the camera is configured to: process an acquired image signal in a non-binning mode and in a cropping manner, to output first image data, and wherein a first image format is used for the first image data;
      performing photographing in a second mode when the zoom ratio is greater than a second ratio and the environmental illuminance is less than the first luminance threshold, wherein the second ratio is less than the first ratio; and
      performing photographing in the second mode when the zoom ratio is greater than the second ratio and less than the first ratio and the environmental illuminance is greater than or equal to the first luminance threshold, wherein in the second mode, the camera is configured to: perform image output for the acquired image signal in a binning mode, to output fourth image data, and wherein a second image format is used for the fourth image data.

2. The method according to claim 1, wherein the first image data is stored in a first buffer; and
   the method further comprises:
   receiving a first operation of a user, wherein the first operation triggers photographing;
   obtaining the first image data from the first buffer in response to the first operation;
   performing bayer image reconstruction on the first image data by using a postprocessing algorithm module or an image signal processor (ISP) first module, to obtain second image data, wherein a second image format is used for the second image data;
   demosaicing the second image data by using an ISP second module, to obtain data in an RGB format; and
   performing RGB processing or YUV processing on the data in the RGB format by using an ISP third module, to obtain data in a YUV format, and outputting a photographed image.

3. The method according to claim 2, wherein the method comprises:
   performing bayer image reconstruction on the first image data by using the ISP first module in a thumbnail stream, to obtain data in a bayer format;
   demosaicing the data in the bayer format by using the ISP second module, to obtain the data in the RGB format; and
   performing RGB processing or YUV processing on the data in the RGB format by using the ISP third module, to obtain the data in the YUV format, and outputting a thumbnail.

4. The method according to claim 1, wherein the method further comprises:
   remosaicing the first image data by using an image signal processor (ISP) first module in a preview path of the first mode, to obtain third image data;
   demosaicing the third image data by using an ISP second module, to obtain data in an RGB format; and performing RGB processing or YUV processing on the data in the RGB format by using an ISP third module, to obtain the data in the YUV format, and outputting a preview image.

5. The method according to claim 1, wherein the method further comprises:
demosaicing the fourth image data by using an image signal processor (ISP) second module in a preview path of the second mode, to obtain data in an RGB format; and
performing RGB processing or YUV processing on the data in the RGB format by using an ISP third module, to obtain data in a YUV format, cropping and upsampling the data in the YUV format, and outputting a preview image.

6. The method according to claim 1, wherein the fourth image data is stored in a first buffer; and the method further comprises:
receiving a second operation of a user, wherein the second operation is used for triggering photographing;
obtaining the fourth image data from the first buffer in response to the second operation;
performing image processing on the fourth image data by using a postprocessing algorithm module or an image signal processor (ISP) second module, to obtain fifth image data; and
cropping and upsampling the fifth image data by using the postprocessing algorithm module or an ISP third module, and outputting a photographed image.

7. The method according to claim 6, wherein the method further comprises:
demosaicing the fourth image data by using the ISP second module in a thumbnail stream, to obtain data in an RGB format; and
performing RGB processing or YUV processing on the data in the RGB format by using the ISP third module, to obtain data in a YUV format, cropping and upsampling the data in the YUV format, and outputting a thumbnail.

8. The method according to claim 1, wherein performing the photographing further comprises:
performing photographing in a third mode when the zoom ratio is equal to the second ratio and the environmental illuminance is greater than or equal to the first luminance threshold, wherein the second ratio is less than the first ratio; and
performing photographing in the third mode when the zoom ratio is equal to the second ratio and the environmental illuminance is less than the first luminance threshold, wherein
in the third mode, the camera is configured to: perform image output for the acquired image signal in the binning mode, to output sixth image data, wherein the second image format is used for the sixth image data.

9. The method according to claim 8, wherein the sixth image data is stored in a first buffer; and the method further comprises:
receiving a third operation of a user, wherein the third operation triggers photographing;
obtaining the sixth image data from the first buffer in response to the third operation;
performing image processing on the sixth image data by using a postprocessing algorithm module or an image signal processor (ISP) second module, to obtain seventh image data; and performing RGB processing or YUV processing on the seventh image data by using an ISP third module, to obtain data in a YUV format, and outputting a photographed image.

10. The method according to claim 9, wherein the method comprises:
demosaicing the sixth image data by using the ISP second module in a thumbnail stream, to obtain data in an RGB format; and
performing RGB processing or YUV processing on the data in the RGB format by using the ISP third module, to obtain data in a YUV format, and outputting a thumbnail.

11. The method according to claim 9, wherein the method further comprises:
demosaicing the sixth image data by using the ISP second module in a preview path of the third mode, to obtain data in an RGB format; and
performing RGB processing or YUV processing on the data in the RGB format by using the ISP third module, to obtain data in a YUV format, and outputting a preview image.

12. An electronic device, comprising a processor and a memory, wherein the processor is coupled to the memory, the memory stores a computer program, and the computer program, when executed by the processor, causes the electronic device to:
turn on a camera;
obtain a zoom ratio and an environmental illuminance in a current photographing environment; and
perform photographing according to the following:
perform photographing in a first mode when the zoom ratio is greater than or equal to a first ratio and the environmental illuminance is greater than or equal to a first luminance threshold, wherein in the first mode, the camera is configured to: process an acquired image signal in a non-binning mode and in a cropping manner, to output first image data, and wherein a first image format is used for the first image data;
performing photographing in a second mode when the zoom ratio is greater than a second ratio and the environmental illuminance is less than the first luminance threshold, wherein the second ratio is less than the first ratio; and
performing photographing in the second mode when the zoom ratio is greater than the second ratio and less than the first ratio and the environmental illuminance is greater than or equal to the first luminance threshold, wherein in the second mode, the camera is configured to: perform image output for the acquired image signal in a binning mode, to output fourth image data, and wherein a second image format is used for the fourth image data.

13. The electronic device according to claim 12, wherein the first image data is stored in a first buffer, and the computer program, when executed by the processor, further causes the electronic device to perform:
receiving a first operation of a user, wherein the first operation triggers photographing;
obtaining the first image data from the first buffer in response to the first operation;
performing bayer image reconstruction on the first image data by using a postprocessing algorithm module or an image signal processor (ISP) first module, to obtain second image data, wherein a second image format is used for the second image data;

demosaicing the second image data by using an ISP second module, to obtain data in an RGB format; and performing RGB processing or YUV processing on the data in the RGB format by using an ISP third module, to obtain data in a YUV format, and outputting a photographed image.

14. The electronic device according to claim 13, wherein the computer program, when executed by the processor, causes the electronic device to perform:

performing bayer image reconstruction on the first image data by using the ISP first module in a thumbnail stream, to obtain data in a bayer format;

demosaicing the data in the bayer format by using the ISP second module, to obtain the data in the RGB format; and performing RGB processing or YUV processing on the data in the RGB format by using the ISP third module, to obtain the data in the YUV format, and outputting a thumbnail.

15. The electronic device according to claim 12, wherein the computer program, when executed by the processor, further causes the electronic device to perform:

remosaicing the first image data by using an image signal processor (ISP) first module in a preview path of the first mode, to obtain third image data;

demosaicing the third image data by using an ISP second module, to obtain data in an RGB format; and performing RGB processing or YUV processing on the data in the RGB format by using an ISP third module, to obtain the data in the YUV format, and outputting a preview image.

16. A non-transitory computer-readable storage medium, storing a computer program, wherein the computer program, when executed by a processor, causes the processor to:

turn on a camera;

obtain a zoom ratio and an environmental illuminance in a current photographing environment; and perform photographing according to the following:

perform photographing in a first mode when the zoom ratio is greater than or equal to a first ratio and the environmental illuminance is greater than or equal to a first luminance threshold, wherein in the first mode, the camera is configured to: process an acquired image signal in a non-binning mode and in a cropping manner, to output first image data, wherein a first image format is used for the first image data;

performing photographing in a second mode when the zoom ratio is greater than a second ratio and the environmental illuminance is less than the first luminance threshold, wherein the second ratio is less than the first ratio; and performing photographing in the second mode when the zoom ratio is greater than the second ratio and less than the first ratio and the environmental illuminance is greater than or equal to the first luminance threshold, wherein in the second mode, the camera is configured to: perform image output for the acquired image signal in a binning mode, to output fourth image data, and wherein a second image format is used for the fourth image data.

17. The non-transitory computer-readable storage medium according to claim 16, wherein the first image data is stored in a first buffer, and wherein the computer program, when executed by the processor, causes the processor further to:

receive a first operation of a user, wherein the first operation triggers photographing;

obtain the first image data from the first buffer in response to the first operation;

perform bayer image reconstruction on the first image data by using a postprocessing algorithm module or an image signal processor (ISP) first module, to obtain second image data, wherein a second image format is used for the second image data;

demosaic the second image data by using an ISP second module, to obtain data in an RGB format; and perform RGB processing or YUV processing on the data in the RGB format by using an ISP third module, to obtain data in a YUV format, and outputting a photographed image.

18. The non-transitory computer-readable storage medium according to claim 17, wherein the computer program, when executed by the processor, causes the processor to:

perform bayer image reconstruction on the first image data by using the ISP first module in a thumbnail stream, to obtain data in a bayer format;

demosaic the data in the bayer format by using the ISP second module, to obtain the data in the RGB format; and perform RGB processing or YUV processing on the data in the RGB format by using the ISP third module, to obtain the data in the YUV format, and outputting a thumbnail.

19. The non-transitory computer-readable storage medium according to claim 16, wherein the computer program, when executed by the processor, causes the processor further to:

remosaic the first image data by using an image signal processor (ISP) first module in a preview path of the first mode, to obtain third image data;

demosaic the third image data by using an ISP second module, to obtain data in an RGB format; and perform RGB processing or YUV processing on the data in the RGB format by using an ISP third module, to obtain the data in the YUV format, and outputting a preview image.

* * * * *